United States Patent
Lin et al.

(10) Patent No.: US 12,510,454 B2
(45) Date of Patent: Dec. 30, 2025

(54) SYSTEM FOR FILTER ANALYSIS AND REGENERATION

(71) Applicant: Taiwan Semiconductor Manufacturing Co., Ltd., Hsinchu (TW)

(72) Inventors: En Tian Lin, Hsinchu (TW); Chih-Chiang Tseng, Hsinchu (TW); Chwen Yu, Hsinchu (TW); Chiao-Ling Weng, Taichung (TW)

(73) Assignee: Taiwan Semiconductor Manufacturing Co., Ltd., Hsinchu (TW)

( * ) Notice: Subject to any disclaimer, the term of this patent is extended or adjusted under 35 U.S.C. 154(b) by 710 days.

(21) Appl. No.: 17/749,056

(22) Filed: May 19, 2022

(65) Prior Publication Data
US 2023/0408393 A1 Dec. 21, 2023

(51) Int. Cl.
*B01D 65/02* (2006.01)
*B01D 63/06* (2006.01)
(Continued)

(52) U.S. Cl.
CPC ........... *G01N 15/08* (2013.01); *B01D 63/067* (2013.01); *B01D 65/02* (2013.01); *B01D 65/10* (2013.01);
(Continued)

(58) Field of Classification Search
CPC .... B01D 65/10; B01D 2321/40; G01N 15/08; G01N 15/0826
See application file for complete search history.

(56) References Cited

U.S. PATENT DOCUMENTS

| | | | |
|---|---|---|---|
| 2009/0063078 A1* | 3/2009 | Chandler | G01N 15/0205 702/81 |
| 2015/0170929 A1* | 6/2015 | Chiang | B01F 25/50 156/345.12 |

FOREIGN PATENT DOCUMENTS

| | | |
|---|---|---|
| CN | 104147937 B | 4/2016 |
| JP | 3-21309 A | 1/1991 |

(Continued)

OTHER PUBLICATIONS

Seo Jong Dae—KR 2004-0035450 A Fit merged—Apr. 29, 2004 (Year: 2004).*

(Continued)

*Primary Examiner* — Bradley R Spies
(74) *Attorney, Agent, or Firm* — Seed IP Law Group

(57) ABSTRACT

The present disclosure is directed to various methods and systems for monitoring real time efficiency of filters as well as testing the filters with tests that are similar to real world use of the filters to update technical specifications of the filters. The methods and systems monitoring the real time efficiency of the filters may utilize one or more particle counters to monitor their efficiency in real time. The data collected by the particle counters may be utilized to determine whether respective ones of the filters need to be replaced or regenerated by a backwash regeneration process. The updated technical specifications from the real world testing of the filters may be utilized in determining whether respective ones of the filters need to be replaced or regenerated. These real world testing and real time monitoring reduces the likelihood that workpieces are exposed to contaminant particles reducing scrap costs.

20 Claims, 12 Drawing Sheets

(51) Int. Cl.
  *B01D 65/10*   (2006.01)
  *G01N 15/08*   (2006.01)
  *H01L 21/67*   (2006.01)
  *B01F 101/58*  (2022.01)

(52) U.S. Cl.
  CPC .... *H01L 21/67017* (2013.01); *B01D 2313/18* (2013.01); *B01D 2313/44* (2013.01); *B01D 2313/50* (2013.01); *B01D 2321/04* (2013.01); *B01D 2321/2058* (2013.01); *B01D 2321/40* (2013.01); *B01F 2101/58* (2022.01); *G01N 2015/084* (2013.01)

(56) References Cited

FOREIGN PATENT DOCUMENTS

| | | | |
|---|---|---|---|
| JP | 2008-80193 | A | 4/2008 |
| KR | 20040035450 | A * | 4/2004 |
| TW | 419769 | B | 1/2001 |
| TW | 202214335 | A | 4/2022 |

OTHER PUBLICATIONS

Sasaki—JP 2008-80193 A machine translation—Apr. 10, 2008 (Year: 2008).*

Kimiharu et al—JP H3-21309 A machine translation—Jan. 30, 1991 (Year: 1991).*

* cited by examiner

SYSTEM FOR FILTER ANALYSIS AND REGENERATION

BACKGROUND

Generally, in the manufacture of semiconductor devices or packages within a semiconductor manufacturing plant (FAB), various fluids are stored and the utilized for refining and processing workpieces (e.g., wafers, substrates, etc.) within a semiconductor fabrication plant (FAB). A system for transporting the various fluids to various workpiece processing tools within the FAB may include pipes that the fluid may pass through to reach the workpiece processing tools. For example, the pipes may extend from a storage tank, which stores the fluid, to the workpiece processing tools. The pipes are configured to transport the fluid from the storage tank to the workpiece processing tools. For example, the fluid is transported along these pipes and is received by the workpiece processing tools, and the workpiece processing tools utilize the fluid in some fashion to refine or process respective workpieces at the workpiece processing tools to manufacture semiconductor devices or packages.

Filters may be present along these pipes to filter the fluid as the fluid travels from the storage tank to the workpiece processing tools. For example, these filters are utilized to filter the fluid to remove contaminants (e.g., particulates, debris, etc.) present within the fluid. These filters trap and capture these contaminants as the fluid moves along the pipes to the workpiece processing tools, respectively. Once the filters reach an end of their usable lifespan, the filters may be replaced or regenerated.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1A:
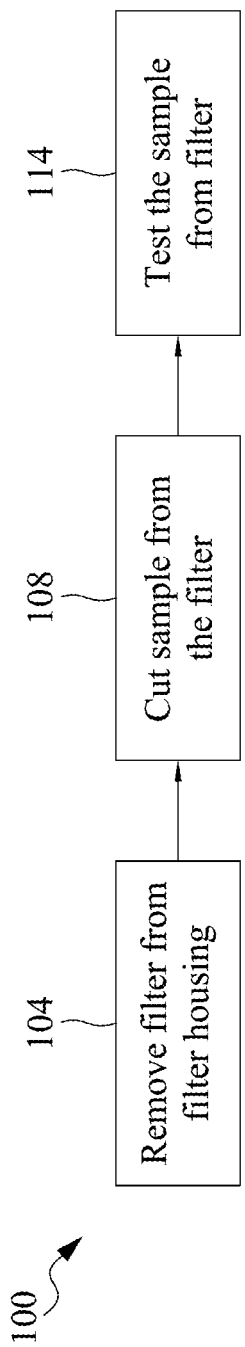
FIG. 1A illustrates a flowchart of an example of a method of testing a filter membrane of a filter cartridge.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper," "left," "right," and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Generally, manufacturers that sell and manufacture filter cartridges containing filter membranes provide manufacturer technical specifications or tool specifications for these filter membranes within these filter cartridges. For example, an average size of pores of the filter membrane are provided to determine a size of particles that may be trapped or filtered by the filter membrane. However, as manufacturing semiconductor devices and packages is susceptible to contaminants, at least some of the filter membranes may be tested to determine the accuracy of the manufacturer technical specifications to reduce the likelihood of manufacturing defective semiconductor devices or packages due to defective filter membranes or filter membranes that are not within the specified tolerances of the manufacturer technical specification.

For example, a filter may be rated to filter out X nanometer sized particles, however, the filter may have an average pore size of X+Y-nanometers over some substantial percentage of the pores of the filter. Such filter would then not be suitable for filtering out X nanometer sized particles from a fluid. Therefore, while the filter could be utilized to filter out>X+Y nanometer particles from a fluid, the filter could not be utilized to effectively filter out<X+Y nanometer particles from a fluid.

In view of the above, while the manufacturer technical specification may assert that their filters can filter out certain nanometer sized particles filters may not be truly effective in filtering out such particles. Accordingly, the manufacturer technical specification cannot be relied upon, especially in a semiconductor manufacturing plant (FAB) where failure to filter out such particles may result in an increase in a number of defective semiconductor devices or packages that are manufactured by the FAB. This increase in the number of defective semiconductor devices or packages results in increased scrap costs and increased material costs as the defective semiconductor devices or packages may not be sold to customers, and, instead, are simply thrown away.

In view of the above discussion, at least some of the present disclosure is directed to systems and methods for testing and determining pore sizes of pores of filter membranes as well as pore distributions of the filter membranes. The pore sizes and pore distributions of the filter membranes may be utilized to generate updated technical specifications that are more accurate with respect to the filter membranes real world efficiency as compared to the filter membranes efficiency asserted in the manufacturer technical specifications.

These updated technical specifications may be utilized in systems and methods that monitor filter membranes of filters in real time, in accordance with some embodiments of the present disclosure. For example, these real time monitoring systems and methods that monitor the efficiency of the filters in real time when in use may utilize the updated technical specifications to provide more accurate determinations than when the manufacturer technical specifications are utilized instead. These determinations may include whether a respective filter membrane needs to be replaced or whether a backwash regeneration process needs to be performed to regenerate or revitalize the respective filter membrane. These methods and systems monitoring real time efficiency of the filters are utilized to reduce the likelihood of exposing workpieces to contaminants (e.g., particles, debris, etc.) within fluids that may result in the manufacturing of defective semiconductor devices or packages, which again at least increases scrap costs and material costs.

Figure 1B:
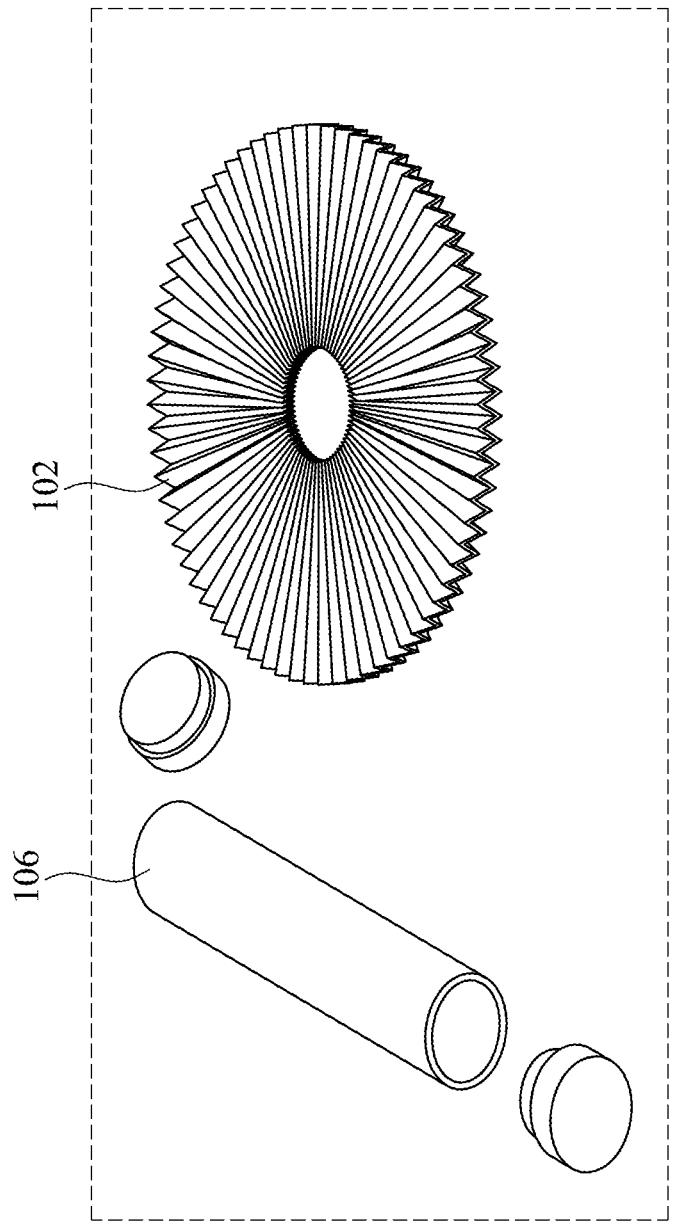
FIG. 1B illustrates a first step of the example of the method as shown in FIG. 1A.

FIG. 1A is directed to a flowchart 100 of an example of a method that may be utilized to test and determine sizes of pores of a filter membrane 102 in FIG. 1B to generate an updated technical specification or confirm whether a manufacturer technical specification with respect to the filter membrane 102 is truly accurate. The method as shown in the flowchart 100 in FIG. 1A is utilized to prepare a sample 112 of the filter membrane 102, which is then placed within a porometer to test and determine sizes of the pores as well as determine a distribution of the pores of the filter membrane 102 itself utilizing the sample 112.

In a first step 104, the filter membrane 102 is removed from a housing 106 of a filter cartridge, which includes the filter membrane 102 housed within the housing 106. The filter membrane 102 is removed from the housing 106 by cutting or breaking the housing 106. This results in the filter cartridge no longer being usable for filtering fluids as cutting or breaking the housing 106 destroys the filter cartridge. For example, the housing 106 may be cut at an end of the housing 106 such that the filter membrane 102 may be removed from the housing 106.

When the filter membrane 102 is present within the housing 106, the filter membrane 102 may be in a compressed state such that the filter membrane 102 fits within the housing 106. After the filter membrane 102 is removed from the housing 106, the filter membrane 102 is fanned out as shown in FIG. 1B such that the filter membrane 102 sits relatively flat on a level surface. As shown in FIG. 1B, the housing 106 is substantially cylindrical, and the filter membrane 102 is substantially donut-shaped (e.g., a circle with a hole extending through the center of the circle) and has a plurality of flutes.

Figure 1C:
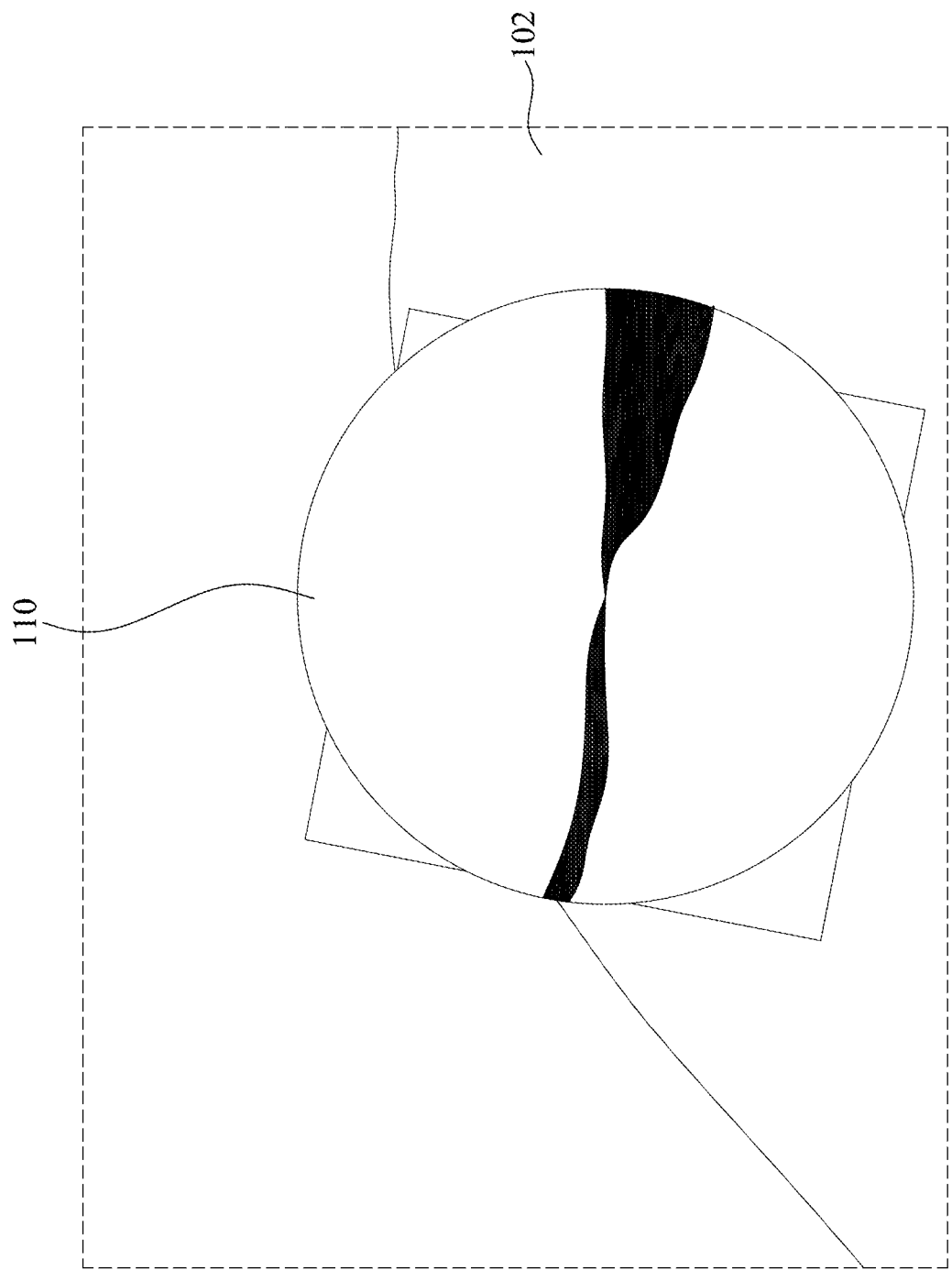
FIG. 1C illustrates a second step of the example of the method as shown in FIG. 1A.

After the first step 104 in which the filter membrane 102 is removed from the housing 106 by cutting and breaking the housing 106, a second step 108 is performed. In the second step 108, a cutting tool 110 (see FIG. 1C) is utilized to cut the sample 112 (see FIG. 1D), which is a small portion of the filter membrane 102. The sample 112 is cut away from the filter membrane 102 by positioning the cutting tool 110 on a selected location on the filter membrane 102 by a user. Once the cutting tool 110 is positioned on the selected location on the filter membrane 102, the user applies pressure downwards onto the cutting tool, which cuts and stamps out the sample 112 from the filter membrane 102. The sample 112 is circular in shape as the cutting tool 110 is circular in shape. The circular shape of the cutting tool 110 may readily be seen in FIG. 1C, and the circular shape of the sample 112 may readily be seen in FIG. 1D.

After the second step 108 in which the sample 112 is cut away from the filter membrane 102, a third step 114 is performed. In the third step 114, the sample 112 is placed within a porometer (not shown) to test and determine pore sizes of the sample 112 as well as the pore distribution of the various sized pores of the sample 112.

In some situations, a capillary flow porometry (CFP) test may then be carried out on the sample 112 under "ASTM F316:2019 Standard Test Methods for Pore Size Characteristics of Membrane Filters by Bubble Point and Mean Flow Pore Test," utilizing the porometer. Under the CFP test, a liquid is introduced to the sample 112 such that the pores of the sample 112 are saturated or filled with the liquid. After the pores have been saturated or filled with the liquid, a gas (e.g., an inert gas, which may be a nitrogen gas) is introduced to the sample 112 to displace the liquid within the pores of the sample 112. A pressure of the gas required to empty the pores is measured and corresponds to the pressure that is required to evacuate the liquid from the narrowest and most constricted part of the pore. A velocity of the gas through the sample 112 is measured such that the pore sizes of the sample 112, and, accordingly, the pore sizes of the filter membrane 102 may be determined. These pore sizes are dimensions of the narrowest and most constricted part of the pores of the sample 112. Introducing the gas to the sample 112 to empty and evacuate the pores may result in the pores expanding or the sample 112 being damaged such that this test may not provide accurate results within tolerances. In some situations, multiple samples 112 may be taken or cut from the filter membrane 102 such that each sample may be tested. Generally, the CFP test may be carried out on the sample 112 of the filter membrane 102 to measure pore sizes ranging from 15-nanometers to 300-micrometers.

In some situations, a liquid-liquid displacement porometry (LLDP) test may be carried out on the sample 112 by the porometer (not shown) instead of the CFP test. The LLDP test is a known test. Under the LLDP test, a first liquid is introduced to the sample 112 such that the pores of the sample 112 are saturated or filled with the first liquid. After the pores have been saturated or filled with the first liquid, a second liquid with higher surface tension than the first liquid is utilized to displace the first liquid by exposing the sample 112 to the second liquid. Unlike the CFP test, the LLDP test can be completed at a very low velocity relative to the CFP test such that smaller pore sizes may be determined. The low velocity of the LLDP test also has a reduced likelihood of damaging the pores or the sample 112 relative to the CFP test such that the LLDP test may provide more accurate results than the CFP test. Otherwise, the LLDP test is similar to the CFP test in that the narrowest and most constricted part of the pore is determined by measuring a pressure and a velocity similar to the CFP test and utilized to determine the pore sizes of the sample 112. These pore sizes are dimensions of the narrowest and most constricted part of the pores of the sample 112. Generally, the LLDP test may be carried out on the sample 112 of the filter membrane 102 to measure pore sizes ranging from 2-nanometers to 0.5-micrometers.

The CFP and LLDP tests may be carried out on one filter membrane 102 selected from a larger number of filter cartridges that are shipped to a customer by a manufacturer of the filter cartridges. This filter membrane 102 may be tested to represent hundreds or thousands of filter membranes within hundreds and thousands of filter cartridges that may be utilized within a semiconductor manufacturing plant (FAB).

In view of the above process, the filter cartridge is destroyed as the housing 106 is cut and broken to access the filter membrane 102 within the housing, and the filter membrane 102 is cut such that the filter membrane 102 is no longer usable. In other words, the filter cartridge is destroyed to gain access to the filter membrane 102 to be tested, and the filter membrane 102 is damaged when cutting away the sample 112 such that the filter membrane 102 is no longer usable. This results in scrap costs as the filter cartridge is destroyed to carry out the above tests and is no longer useable. While multiple samples 112 may be taken from a filter membrane 102 and tested in succession, performing these tests over and over again takes time and increases costs.

In view of the above process, the sample 112 which is only a small portion of the filter membrane 102 and is placed in a porometer, which is not similar to how the filter cartridge would actually be deployed and utilized within the FAB. In other words, testing the sample 112 in the above discussed processes with respect to FIGS. 1A-1D does not reproduced how the filter membrane 102 would actually be deployed and utilized in real world use. Accordingly, the present disclosure is directed to systems and methods to analyze and determine pore sizes of filter membranes using systems and methods that are more similar to real world use conditions of the filter membranes than those discussed with respect to FIGS. 1A-1D above. In addition, embodiments in accordance with the present disclosure provide systems and methods for evaluating the performance and effectiveness of the filter membranes and do not require destruction of the filter membrane.

Figure 1D:
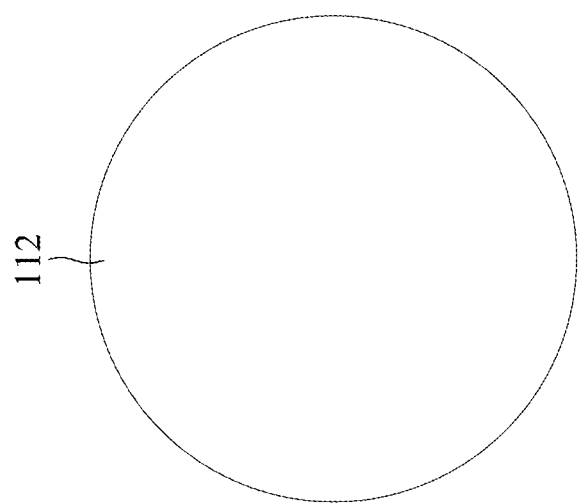
FIG. 1D illustrates an example of a sample that has been cut from the filter as shown in FIG. 1B.
Figure 2A:
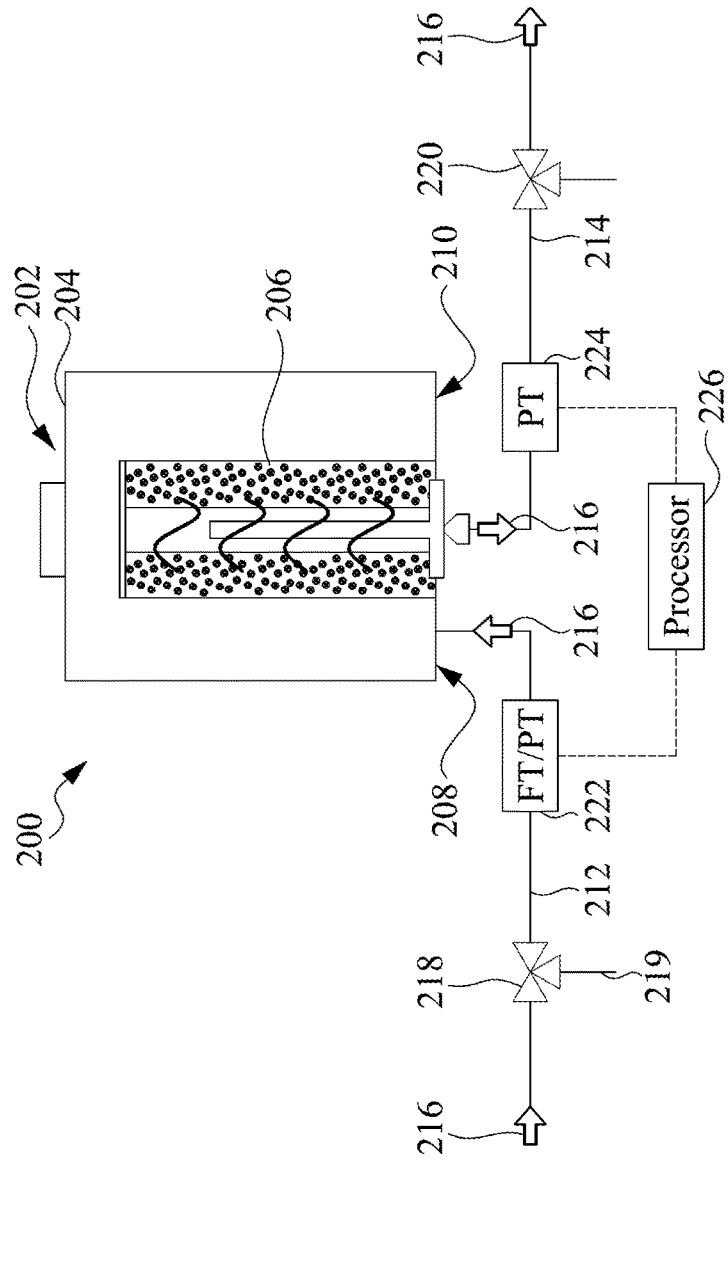
FIG. 2A illustrates a system to test a filter membrane of a filter cartridge, in accordance with some embodiments.

FIG. 2A is directed to a system 200 that is utilized to perform tests, e.g., evaluations, on a filter cartridge 202, in accordance with some embodiments. The tests to be carried out, which will be discussed in greater detail later herein, are carried out under conditions that are more similar to real world use of the filter cartridge 202 as compared to the testing methods discussed above with respect to FIGS. 1A-1D in which the sample 112 cut away from the filter membrane 102 is tested utilizing the porometer (not shown).

As shown in FIG. 2A, a housing 204 of the filter cartridge 202 contains a filter membrane 206. The housing 204 may be the same or similar to the housing 106 as discussed with respect to FIG. 1B, and the filter membrane 206 may be the same or similar to the filter membrane 102 as discussed above with respect to FIG. 1B. The filter membrane 206 is compressed such that the filter membrane 206 is enclosed within the housing 204. The filter cartridge 202 further includes a first opening 208 (e.g., inlet or outlet) accessible from an external surface of the housing 204, and a second opening 210 (e.g., inlet or outlet) accessible from the external surface of the housing 204.

A first fluid pathway 212 has an end in fluid communication with the first opening 208, and a second fluid pathway 214 has an end in fluid communication with the second opening 210. Depending on a direction of flow of a fluid through the first and second fluid pathways 212, 214, respectively, and the first and second openings 208, 210, respectively, the first opening 208 may be an inlet and the second opening 210 may be an outlet. Depending on the direction of flow of the fluid through the first and second fluid pathways 212, 214, respectively, and the first and second openings 208, 210, respectively, the first opening 208 may be an outlet and the second opening 210 may be an inlet.

In the embodiment of the system as shown in FIG. 2A, a fluid flows successively through the first fluid pathway 212, the first opening 208, the second opening 210, and the second fluid pathway 214, which is represented by arrows 216. A first valve 218 is along the first fluid pathway 212, and a second valve 220 is along the second fluid pathway 214. The first and second valves 218, 220 may be opened and closed to introduce a fluid into and through the filter cartridge 202.

A first sensor 222 (e.g., FT/PT) is present along the first fluid pathway 212 and is between the first valve 218 and the first opening 208. A second sensor 224 (e.g., PT) is present along the second fluid pathway 214 and is between the second opening 210 and the second valve 220. The first and second sensors 222, 224 may be an individual sensor or multiple sensors working together. For example, in this embodiment as shown in FIG. 2A, the first sensor 222 is or includes both a fluid flow rate transducer (FT) and a pressure transducer (PT), and the second sensor 224 is or includes a pressure transducer (PT). The fluid flow transducer of the first sensor 222 measures a flow of the fluid passing through the first fluid pathway 212, for example, the fluid flow rate transducer (e.g., FT) measures a velocity of the fluid passing through the first fluid pathway 212 and utilizes that velocity to determine the flow of the fluid through the first fluid pathway 212. The pressure transducers (e.g., PT) of the first and second sensors 222, 224, respectively, measure a pressure of the fluid passing through the first fluid pathway 212 and the second fluid pathway 214, respectively.

A processor 226 (e.g., computer, smart tablet, smartphone, etc.) is in electrical communication with the first sensor 222 and the second sensor 224 such that the processor 226 may readily receive respective electrical signals from the first sensor 222 and the second sensor 224. The processor 226 is configured to receive and process these respective electrical signals output by the first and second sensors 222, 224, respectively, for example, to collect data that may be utilized to determine pore sizes of pores of the filter membrane 206 as well as a pore distribution of the filter membrane 206 when testing the filter cartridge 202.

Figure 3A:
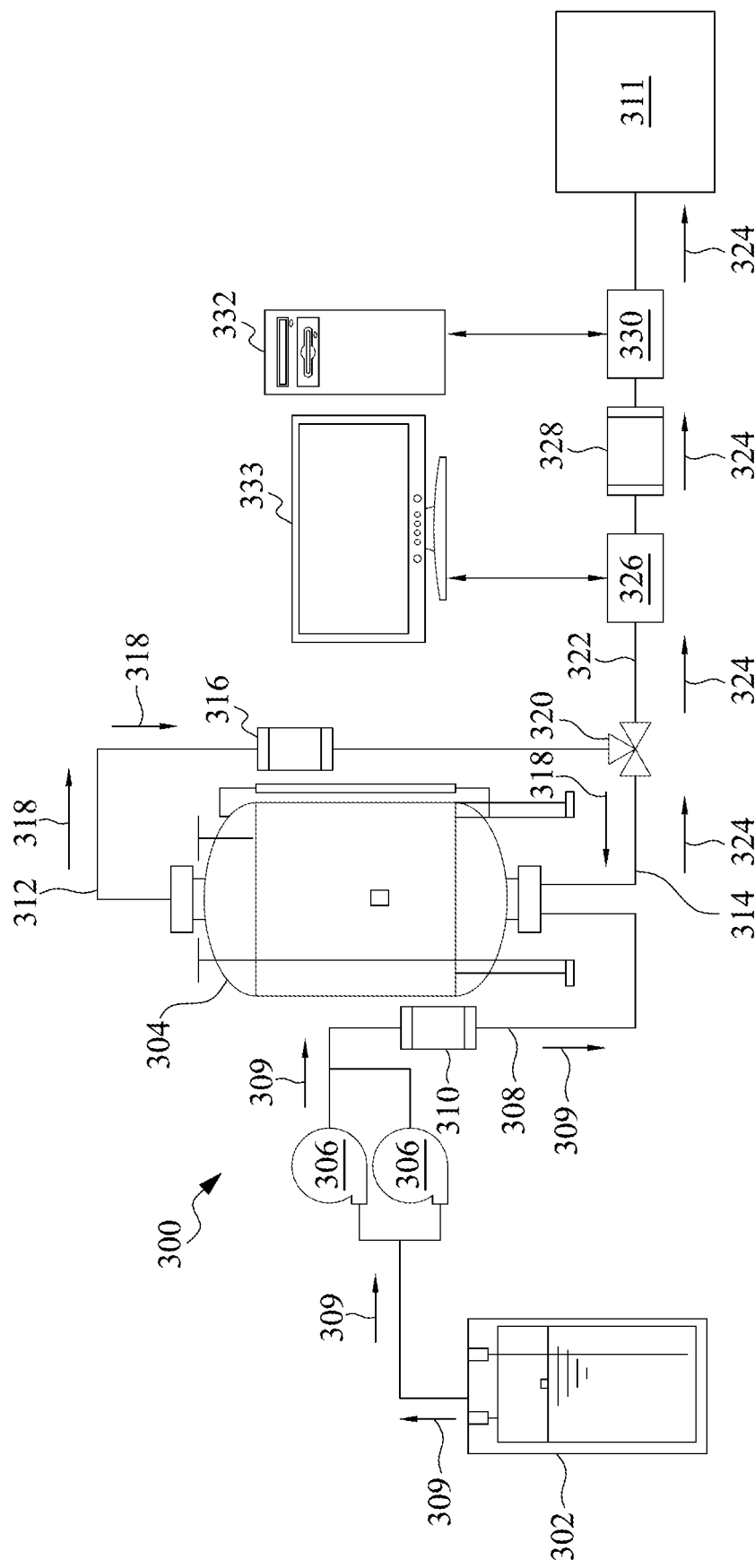
FIG. 3A illustrates a system including a filter that is monitored in real time, in accordance with some embodiments.
Figure 5A:
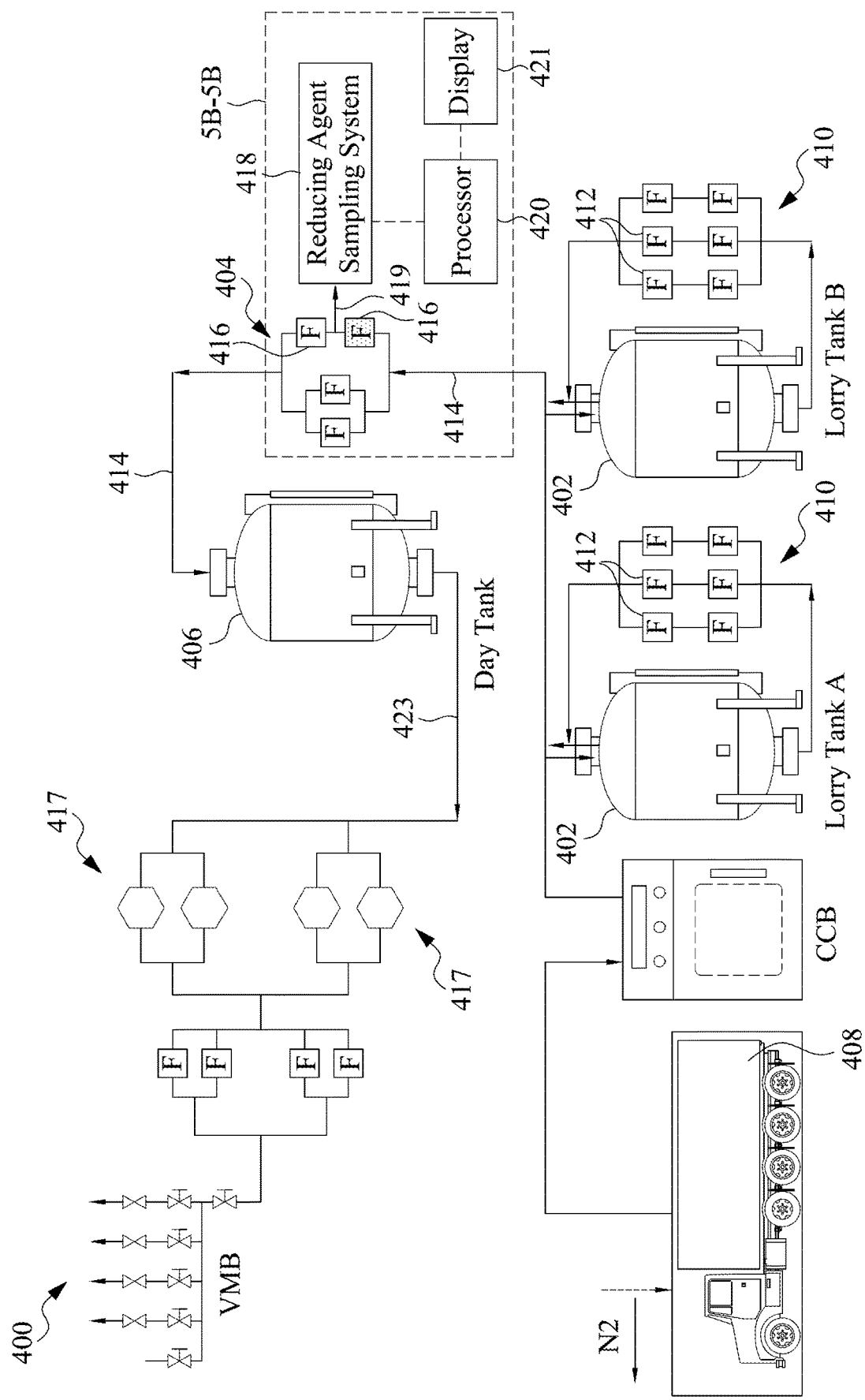
FIG. 5A illustrates a system including a filter that is monitored in real time, in accordance with some embodiments.

The system 200 is the same or similar to a real world use of the filter cartridge 202, which will become more readily apparent in view of the following discussion within the present disclosure. For example, see discussions of FIGS. 3A and 5A of the present disclosure as follows herein. The respective filters in FIGS. 3A and 5A may be set up in the same fashion as the filter cartridge 202 as shown in FIG. 2A except that the respective filters in FIGS. 3A and 5A are being utilized to filter contaminants from a fluid to be provided to workpiece processing tools within a semiconductor manufacturing plant (FAB) to refine and process workpieces (e.g., wafers, substrates, etc.). Accordingly, by utilizing the system 200 as shown in FIG. 2A, the filter cartridge 202 may be tested after it has been exposed to a real world use of the filter cartridge 202 and may be placed back into use. This is in contrast to the method of testing the filter membrane 102 as discussed earlier herein with respect to FIGS. 1A-1D, which tests less than the entire filter membrane 206 and does not allow the filter membrane 206 back into use after testing.

The system 200 may be utilized to determine the pore sizes (e.g., average pore size) of the pores of the filter membrane 206 enclosed within the housing 204 of the filter cartridge 202. For example, a CFP test, an LLDP test, or both may be carried out to determine the pore sizes of the pores of the filter membrane 206 as well as the distribution of the pore sizes of the filter membrane 206. While the CFP test, the LLDP test, or both may be performed on the filter membrane 206, the LLDP test is generally utilized over the CFP test when possible as the LLDP test has a reduced likelihood of damaging the filter membrane 206 such that the filter cartridge 202 is still usable even after being tested under the LLDP test to determine the pore sizes of the pores of the filter membrane 206 as well as the pore size distribution of the filter membrane 206. The LLDP testing of the filter cartridge 202 utilizing the system 200 will be discussed in further detail with respect to FIG. 2B as follows herein.

Figure 2B:
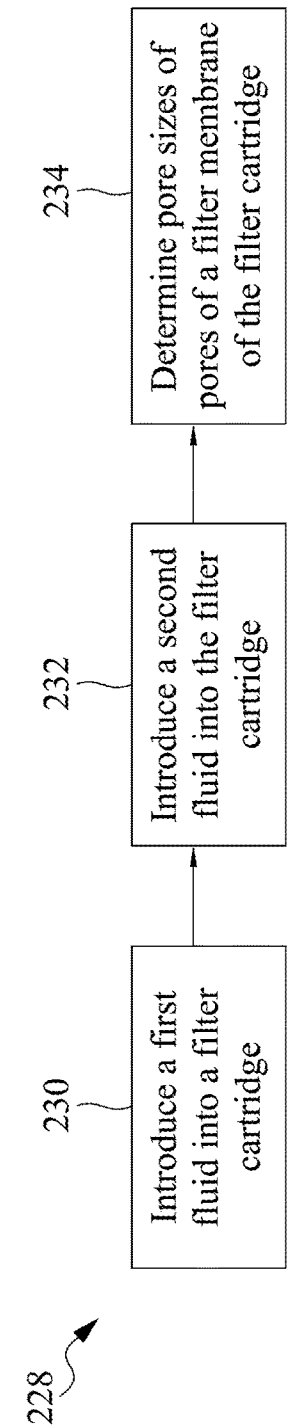
FIG. 2B illustrates a flowchart of a method of utilizing the system to test the filter membrane of the filter cartridge as shown in FIG. 2A, in accordance with some embodiments.

A flowchart 228 is shown in FIG. 2B, the flowchart 228 illustrates a method in utilizing the system 200 to test the filter cartridge 202 to determine the pore sizes of the pores of the filter membrane 206. While the details of the following discussion with respect to the flowchart 228 are discussed with respect to testing the filter cartridge 202 to determine the pore sizes of the pores and the pore size distribution of the filter membrane 206 with the LLDP test, it will be readily appreciated that the system 200 may be utilized to test the filter cartridge 202 to determine the pore sizes of the pores and the pore distribution of the filter membrane 206 with the CFP test instead of the LLDP test. For example, the LLDP test may be utilized when the filter membrane 206 has the pores with pore sizes of 2-nanometers to 0.5-micrometers, and the CFP test may be utilized when the filter membrane 206 has pores with pore sizes of 15-nanometers to 300-micrometers. Alternatively, both the LLDP test and the CFP test may be performed on the filter membrane 206 to collect additional data points with respect to the pore sizes of the pores and the pore distribution of the filter membrane 206.

When utilizing the system 200 to perform the LLDP test to determine the pore sizes of the pores and the pore distribution of the filter membrane 206 of the filter cartridge 202, in a first step 230 of the flowchart 228 of the method, a first fluid, capable of wetting the exposed surfaces of the filter membrane 206, is introduced into the housing 204 of the filter cartridge 202 through the first opening 208 by moving the first fluid through the first fluid pathway 212 in the direction of the arrows 216. Introducing the first fluid into the filter cartridge 202 may include opening the first valve 218 and the second valve 220 to direct the first fluid through the first fluid pathway 212 and the second fluid pathway 214.

Once the first fluid exits the first fluid pathway 212 and enters the housing 204 through the first opening 208, the first fluid comes into contact with the filter membrane 206. The first fluid pathway 212 is continually introduced into the housing 204 through the first opening 208 until the pores of the filter membrane 206 are fully saturated and filled with the first fluid. For example, the pores of the filter membrane 206 may be fully saturated and filled when a first pressure at the first sensor 222 is substantially equal to (e.g., equilibrium) a second pressure at the second sensor 224.

After the pores of the filter membrane 206 are fully saturated and filled in the first step 230, a second step 232 in the flowchart 228 of the method is performed. In the second step 232, a second fluid (e.g., a fluid immiscible with the first fluid and capable of wetting the exposed surfaces of the pores) is introduced into the housing 204 of the filter cartridge 202 through the first opening 208 by moving the second fluid through the first fluid pathway 212 in the direction of the arrows 216. Introducing the second fluid into the filter cartridge 202 may include closing a first fluid opening of the first valve 218 and opening a second fluid opening of the first valve 218 such that the flow of the first fluid is stopped from entering the first fluid pathway 212, and the flow of the second fluid may readily enter and flow through the first fluid pathway 212 into the housing 204 of the filter cartridge 202 through the first opening 208. For example, the second fluid may enter the first valve 218 by passing through a third fluid pathway 219 as shown in FIG. 2A.

Once the second fluid exits the first fluid pathway 212 and enters the housing 204 through the first opening 208, the second fluid comes into contact with the filter membrane 206 within the housing 204, and the second fluid presses against the first fluid present within the pores of the filter membrane 206. The second fluid displaces the first fluid within the pores of the filter membrane 206 and fills the pores of the filter membrane 206.

As the second fluid is displacing the first fluid from the pores of the filter membrane 206 by introducing the second fluid into the housing 204 through the first fluid pathway 212, the first sensor 222 and the second sensor 224 are collecting data with respect to the second fluid and the first fluid, respectively, within the first and second fluid pathways 212, 214, respectively. Once it is determined that the second fluid has displaced all of the first fluid from the pores of the filter membrane 206, e.g., when the pressure measured by the first sensor 222 is equal to the pressure measured by the second sensor 224, first data and second data is collected. In other embodiments, first data and second data are collected continuously from before the time when flow of the second fluid is initiated.

First data (e.g., flow rate and pressure), collected by the first sensor 222 after it is determined that the second fluid has displaced all of the first fluid from pores of the filter membrane 206, is sent to the processor 226 as first electrical signals, which is representative of the first data. Second data collected by the second sensor 224 (e.g., pressure), after it is determined that the second fluid has displaced all of the first fluid from pores of the filter membrane 206, is sent to the processor 226 as second electrical signals, which is representative of the second data. In some embodiments, second data can also include flow rate data measured at second sensor 224. The processor 226 is configured to process and analyze the first and second electrical signals, respectively, representing the first data and the second data, respectively, and transmitted from the first sensor 222 and second sensor 224, respectively.

In a third step 234 in the flowchart 228 of the method, once the processor 226 receives the first and second electrical signals, respectively, the processor 226 analyzes these first and second electrical signals and utilizes the first and second electrical signals to determine the pore sizes of the pores and the pore size distribution of the filter membrane 206. For example, the first and second electrical signals may be representative of input values utilized in an algorithm, such as the Young-Laplace Equation, to determine the average pore size of the pores and the average pore size distribution of the filter membrane 206 within the housing 204 of the filter cartridge 202.

Unlike the method illustrated by flowchart 100 as shown in FIG. 1A and as discussed with respect to FIGS. 1A-1D, the filter membrane 206 is not cut or defaced by cutting out a sample from the filter membrane 206 similar to the sample 112 of the filter membrane 102 as shown in FIG. 1D. Unlike the method as discussed with respect to FIGS. 1A-1D, the filter membrane 206 of the filter cartridge 202 is entirely and completely tested intact such that the filter membrane 206 is evaluated under conditions that are more similar to real world use conditions of the filter membrane 206 within the housing 204 instead of only testing a small portion of the filter membrane 206 or utilizing a test that destroys the filter membrane. Testing the filter membrane 206 when fully intact instead of testing only a small portion of the filter membrane 206 (see sample 112), provides a greater number of pores of the filter membrane 206 that undergo testing as compared to testing the sample 112 as shown in FIG. 1D. This greater number of pores of the filter membrane 206 that are tested results in more accurate results and provides more reliable information as to the sizes of the pores and the pore size distribution of the filter membrane 206, and, therefore, provides a more accurate determination of an average pore size of the pores of the filter membrane 206 relative to when only testing the sample 112 of the filter membrane 102 as discussed with respect to FIGS. 1A-1D.

Unlike the method illustrated by flowchart 100 as shown in FIG. 1A and as discussed with respect to FIGS. 1A-1D, the method in the flowchart 228 of FIG. 2B may be carried out relatively quick as compared to the method in the flowchart 100. For example, the method in the flowchart 100 has a user to remove the filter membrane 102 from the housing 106, determine a good sample location on the filter membrane 102, cut the sample 112 from the filter membrane 102 with the cutting tool 110, and then carry out the testing on the sample 112 with the porometer. Alternatively, the method in the flowchart 228 simply allows the user to couple the filter cartridge 202 to the first fluid pathway 212 and the second fluid pathway 214 without having to take extra time to determine an appropriate sample location on the filter membrane 206 or cutting a sample from the filter membrane 206. Accordingly, the method in the flowchart 228 takes less time for the user to perform relative to the user performing the method in the flowchart 100. This reduced performance time of the method in the flowchart 228 relative to the method in the flowchart 100 reduces costs and improves efficiency in that several tests may be carried out utilizing the method in the flowchart 228 in the same time it takes to carry out the method in the flowchart 100 one time.

Figure 2C:
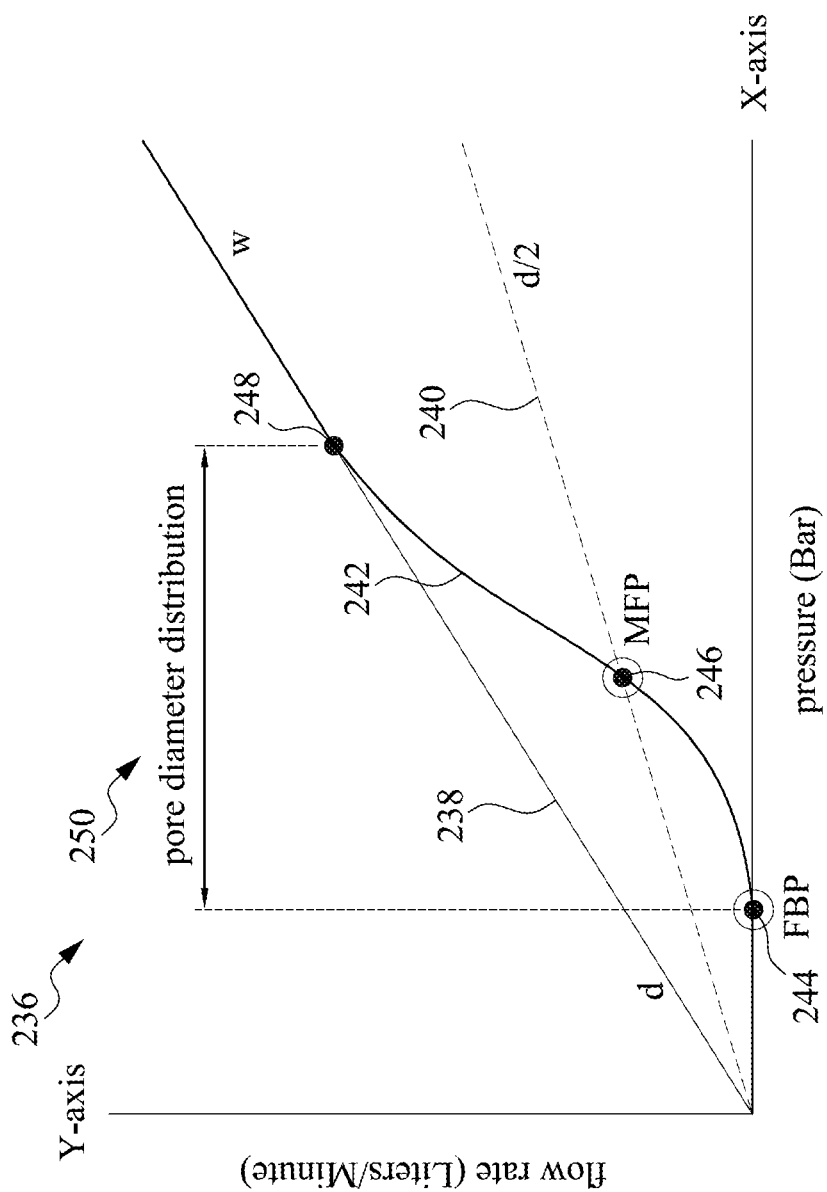
FIG. 2C illustrates a graph of various data correlated together utilizing the system to test the filter membrane of the filter cartridge as shown in FIG. 2A, in accordance with some embodiments.

FIG. 2C is directed to a graph 236. The data collected from testing the filter membrane 206 of the filter cartridge 202 by utilizing the system 200 as shown in FIG. 2A utilizing the method as shown in the flowchart 228 as shown in FIG. 2B is correlated and displayed in the graph 236. An X-axis of the graph 236 is a pressure measured in "bars," and the Y-axis of the graph 236 is a flow rate measured in "liters/minute" (L/min).

The graph 236 includes a dry curve 238. A test may have been carried out utilizing the system 200 as shown in FIG. 2A to pass a gas (e.g., an inert gas, which may be a nitrogen gas) through the filter membrane 206 before the filter membrane 206 is wetted with a liquid. The graph 236 further includes a half dry curve 240, which is obtained by dividing the flow values of the dry curve in half. The graph 236 further includes a wet curve 242 that was determined by conducting the CFP test, the LLDP test, or both utilizing the system 200 to test the filter membrane 206 as discussed above with respect to FIGS. 2A and 2B. The wet curve 242 represents a measured flow (e.g., fluids, gasses, or liquids) through the filter membrane 206 within the filter cartridge 202 against an applied pressure (e.g., fluids, gasses, or liquids) when carrying out the CFP test, the LLDP test, or both utilizing the system 200 to test the filter membrane 206 of the filter cartridge 202. The wet curve 242 may be inversely proportional to pore throat sizes of the pores of the filter membrane 206 of the filter cartridge 202.

The dry curve 238, the half dry curve 240, and the wet curve 242 are plotted against each other as shown in the graph 236. The data from the dry curve 238, the half dry curve 240, and the wet curve 242 may be utilized to determine or provide information about a porous network of the filter membrane 206 of the filter cartridge 202. This data from the graph 236 may be utilized in monitoring an efficiency of the filter membrane 206 of the filter cartridge 202 when the filter cartridge 202 is being utilized in a real world system to filter out contaminants (e.g., debris, particles, etc.) within a fluid and is being monitored by one or more sensors (e.g., particle counters, flow sensors, pressure sensors, etc.) in electrical communication with a processor.

A first point 244 corresponds to a largest pore size of the filter membrane 206. The first point 244 may be referred to as a first bubble point. A second point 246 is a mean flow pore that is calculated at a pressure where the wet curve 242 and the half dry curve 240 intersect each other, and the second point 246 corresponds to a size of a pore at which 50% of a total flow (e.g., fluids, gasses, or liquids) can be accounted. A third point 248 corresponds to a smallest pore size of the filter membrane 206. A pore diameter distribution 250 extends from the first point 244 to the third point 248. This data correlated along the respective curves 238, 240, 242 as plotted in the graph 236 may be utilized to determine average pore sizes of the filter membrane 206 of the filter cartridge 202 as well as distribution of these averaged sized pores along the filter membrane 206 of the filter cartridge 202.

FIG. 3A is directed to a system 300, in accordance with an embodiment of the present disclosure, including a raw material tank 302 that contains a raw material such as a fluid. The fluid stored in the raw material tank 302 is pumped from the raw material tank 302 to a storage tank 304. The fluid is pumped by one or more pumps 306 from the raw material tank 302 through a first fluid pathway 308 to the storage tank 304. A first filter 310 is along the first fluid pathway 308 and the fluid passes through the first filter 310 and is filtered by the first filter 310. After passing through the first filter 310, the fluid continues on through the first fluid pathway 308 and enters the storage tank 304. The flow of fluid through the first fluid pathway 308 is represented by arrows 309.

The fluid may then be stored within the storage tank 304 as the fluid awaits to be utilized by a workpiece processing tool 311 to process and refine one or more workpieces (e.g., wafer, substrate, etc.) at the workpiece processing tool 311. For example, the workpiece processing tool 311 may be an EUV lithography tool, an etching tool, a photolithography tool, or may be some other similar or like type workpiece processing tool that is configured to be utilized within a semiconductor manufacturing plant (FAB).

When the fluid is being stored within the storage tank 304, a circulation pump (not shown), which may be integral to the storage tank 304, may pump the fluid along a second fluid pathway 312 and a third fluid pathway 314. A second filter 316 is along the second fluid pathway 312. The second filter 316 filters the fluid as the fluid is circulated through the storage tank 304, the second fluid pathway 312, and the third fluid pathway 314. This flow of the fluid along the second and third fluid pathways 312, 314 such that the fluid is circulated and filtered by the second filter 316 is represented by arrows 318 as shown in FIG. 3A.

A valve 320 is at a junction of the second fluid pathway 312, the third fluid pathway 314, and the fourth fluid pathway 322. When fluid is being circulated through the second fluid pathway 312 and the third fluid pathway 314, the valve 320 is opened such that the fluid may readily pass through the valve 320 from the second fluid pathway 312 into the third fluid pathway 314 but not enter the fourth fluid pathway 322. In other words, the valve 320 blocks or prevents the fluid from entering the fourth fluid pathway 322 in this situation.

When the workpiece processing tool 311 receives and utilizes the fluid from the storage tank 304 to process one or more workpieces at the workpiece processing tool 311, the valve 320 may be opened and closed such that the fluid may enter the third fluid pathway 314 and pass through the valve 320 into the fourth fluid pathway 322 while blocking the fluid from entering the second fluid pathway 312. The fluid then travels along the fourth fluid pathway 322 to the workpiece processing tool 311 which is represented by arrows 324.

A first particle counter 326, a third filter 328, and a second particle counter 330 are along the fourth fluid pathway 322, and the fluid passes through the first particle counter 326, the third filter 328, and the second particle counter 330 before reaching the workpiece processing tool 311. The third filter 328 is between the first particle counter 326 and the second particle counter 330. In other words, the first particle counter 326 is upstream from the third filter 328 along the fourth fluid pathway 322, and the second particle counter 330 is downstream from the third filter 328 along the fourth fluid pathway 322. The first and second particle counters 326, 330 may both be referred to as liquid particle counters (LPC).

The first, second, and third filters 310, 316, 328 as described above with respect to FIG. 3A may be the same or similar to the filter cartridge 202 as described above with respect to FIG. 2A. In other words, the first, second, and third filters 310, 316, 328 may include at least some of the features of the filter cartridge 202 as shown in FIG. 2A.

The first and second particle counters 326, 330, respectively, may be the same or similar to the particle counters such as those described in U.S. patent application Ser. No. 16/103,934, corresponding to U.S. Published Patent Application No. 2020/00056978. Accordingly, for simplicity and brevity of the present disclosure, structural features of the first and second particle counters are not described in further detail herein.

The first and second particle counters 326, 330, respectively, are configured to count contaminant particles within the fluid as the fluid travels through the first and second particle counters 326, 330, respectively. The first particle counter 326 counts contaminant particles and determines sizes of the contaminant particles within the fluid before the fluid is filtered by the third filter 328, and the second particle counter 330 counts the contaminant particles and determines the sizes of the contaminant particles within the fluid after the fluid is filtered by the third filter 328. In other words, the first and second particle counters 326, 330, respectively, may both count the contaminant particles and determine the sizes of the contaminant particles that pass through the first and second particle counters 326, 330, respectively, as shown in FIG. 3A.

A processor 332 is in electrical communication with the first and second particle counters 326, 330, respectively. The first particle counter 326 outputs first electrical signals representative of the contaminant particles counted as well as sizes of the contaminant particles within the fluid before being filtered by the third filter 328, and the second particle counter 330 outputs second electrical signals representative of the contaminant particles counted as well as the sizes of the contaminant particles within the fluid after being filtered by the third filter 328.

The processor 332 may be pre-loaded with an updated technical specification for the third filter 328 that is more accurate than a manufacturers technical specification of the third filter. For example, the updated technical specification for the third filter 328 may have been determined or updated from a manufacturer technical specification to be more accurate than the manufacturer technical specification by utilizing the system 200 described above to perform the method described in the flowchart 228 to determine pore sizes of pores and a pore size distribution of a respective filter membrane of the third filter 328. This updated technical specification allows for the processor 332 to make more accurate and precise determinations regarding the performance of the filter 328 when the updated more accurate technical specification is utilized instead of the manufacturer technical specification, which again is less accurate than the updated technical specification. The updated technical specification may include the data similar to data represented by the graph 236 as shown in FIG. 2C.

Figure 3B:
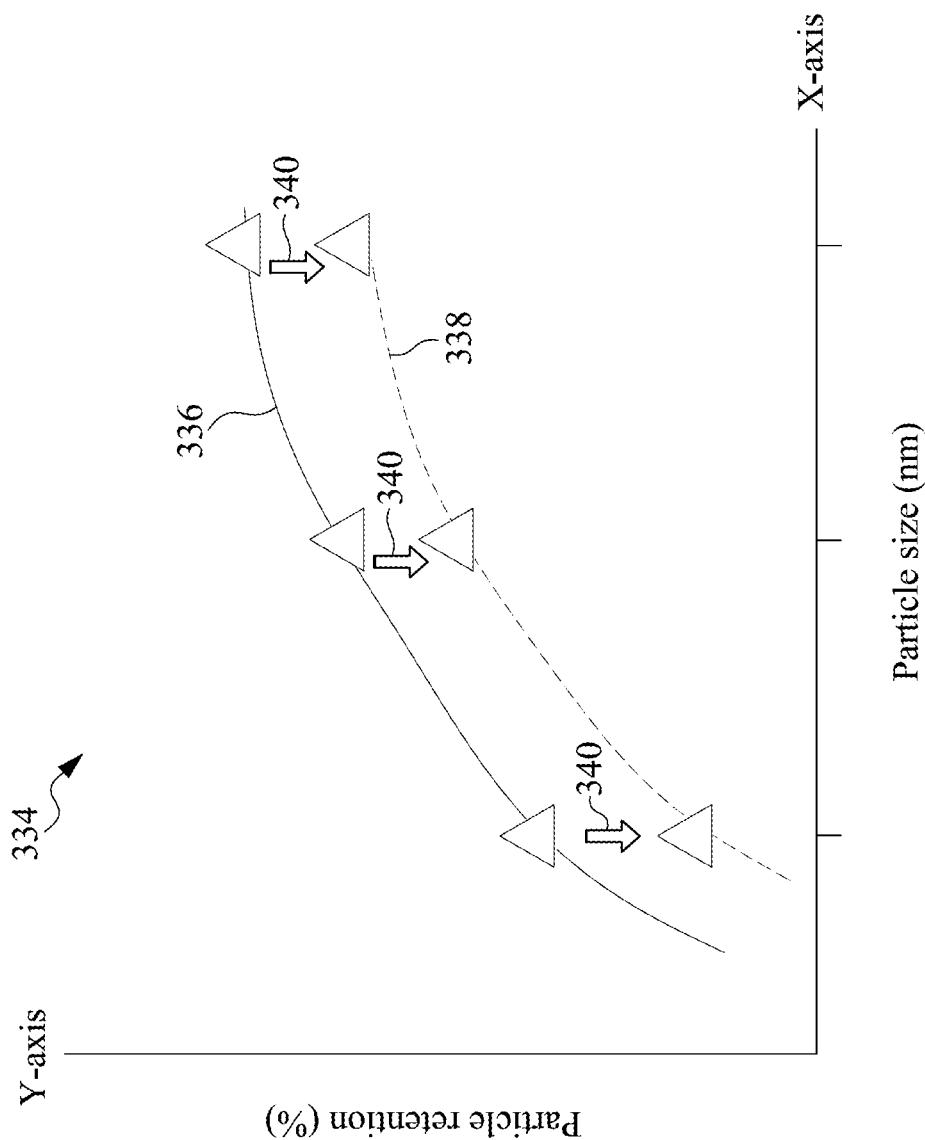
FIG. 3B illustrates a graph with respect to monitoring the filter of the system in real time as shown in FIG. 3A, in accordance with some embodiments.

The first electrical signals received by the processor 332 from the first particle counter 326 represents one or more first particle counts of different sized ones of the contaminant particles within the fluid before being filtered by the third filter 328. The second electrical signals received by the processor 332 from the second particle counter 330 represents one or more second particle counts of different sized ones of the contaminant particles within the fluid after being filtered by the third filter 328. The processor 332 utilizes the first particle counts, the second particle counts, and the updated technical specification for the third filter 328, which again was determined utilizing the method shown in the flowchart 228, to determine a real time efficiency of the third filter 328 when the third filter 328 is in use and is filtering the fluid. For example, as shown in FIG. 3B, this efficiency of the third filter 328 may be multiple particle retention percentages for multiple different sized ones of the contaminant particles still present within the fluid after passing through the third filter 328. These particle retention percentages may be calculated by the following formula:

$$\text{Particle Retention Percentage (\%)} = \frac{\text{Upstream} - \text{Downstream}}{\text{Upstream}} \times 100$$

In the above formula, "upstream" represents the first particle counts of the contaminant particles counted by the first particle counter 326, and "downstream" represents the second particle counts of the contaminant particles counted by the second particle counter 330. This particle retention percentage may be calculated for each different sized ones of the contaminant particles that pass through the third filter 328 as shown in a graph 334 of FIG. 3B.

Referring back to FIG. 3A, a display 333 (e.g., a computer screen, a television screen, a smart device screen, etc.) is in electrical communication with the processor 332. The display 333 displays real time information and data received from the processor 332 about real time characteristics of the third filter 328 (e.g., particle retention efficiency), the first particle counter 326 (e.g., first particle counts), the second particle counter 330 (e.g., second particle counts), and the fluid (e.g., pressure, flow rate, etc.) as the fluid passes through the fourth fluid pathway 322. While not shown, additional sensors such as flow rate sensors, pressure sensors, or some other similar or like type of sensors may be along the respective fluid pathways 308, 312, 314, 322 of the system 300. These additional sensors may be in electrical communication with the processor 332 and may be utilized by the processor 332 to monitor various characteristics of the third filter 328, the first particle counter 326, the second particle counter 330, and the fluid as the fluid moves along the respective fluid pathways 308, 312, 314, 322 of the system 300.

FIG. 3B is directed to the graph 334 illustrating a comparison that is processed by the processor 332 in real time utilizing the first particle counts from the first particle counter 326, the second particle counts from the second particle counter 330, and the updated technical specification with respect to the third filter 328. The graph 334 includes an X-axis of particle sizes in nanometers and a Y-axis of particle retention percentages (%).

The graph 334 includes a first line 336, which is a solid line. The first line 336 represents a particle retention efficiency percentage of the third filter 328 when the third filter 328 is brand new. The first line 336 is determined and set based on the updated technical specification as generated utilizing the system 200 and the method in the flowchart 228 as discussed above. The first line 336 includes the particle retention percentages for different sized ones of the contaminant particles when the third filter 328 is brand new, barely used, or after a backwash regeneration process has been performed on the third filter 328 to regenerate and revitalize the third filter 328.

The graph 334 further includes a second line 338, which is a dotted line. The second line 338 represents a real time (e.g., present and current) particle retention efficiency of the third filter 328 when the third filter 328 is in use and is filtering the contaminant particles from the fluid. This real time contaminant particle retention efficiency (%) of the third filter 328 may be determined and continually updated in real time by utilizing the most recent particle counts received from the first and second particle counters 326, 330, respectively, by the processor 332. After receiving the most recent particle counts, the processor 332 may update the second line 338 in real time utilizing these most recent particle counts to represent the particle retention efficiency (%) of the third filter 328 in real time as the third filter 328 continually filters the contaminant particles from the fluid.

Arrows 340 represent a decay of a particle retention efficiency (%) of the third filter 328 as more and more of the fluid passes through the third filter 328. In other words, the more and more the third filter 328 is used to filter the contaminant particles from the fluid, the more and more the particle retention efficiency (%) of the third filter 328 decays such that the third filter 328 may not efficiently filter the contaminant particles from the fluid as the fluid passes through the third filter 328 along the fourth fluid pathway 322.

After the second line 338 has reduced past a selected threshold, which may have been selected based on the testing of the third filter 328 utilizing the system 200 and the method in the flowchart 228 as shown in FIGS. 2A and 2B, the processor 332 may send a signal to the display 333 to output a notice on the display 333. The notice may be a warning or notice that the third filter 328 may need to be replaced or may need to be regenerated by performing a backwash regeneration process. If a backwash regeneration process had already been carried out on the third filter 328 one or more times in the past, the processor 332 may output a replacement warning or notice without outputting the backwash regeneration warning or notice. In other words, the processor 332 may analyze particles counts as well as other factors or parameters in determining whether the third filter 328 must be replaced as the third filter 328 is reaching an end of its usable lifespan, or whether a backwash regeneration process may be successful in regenerating and revitalizing the third filter 328.

Figure 4A:
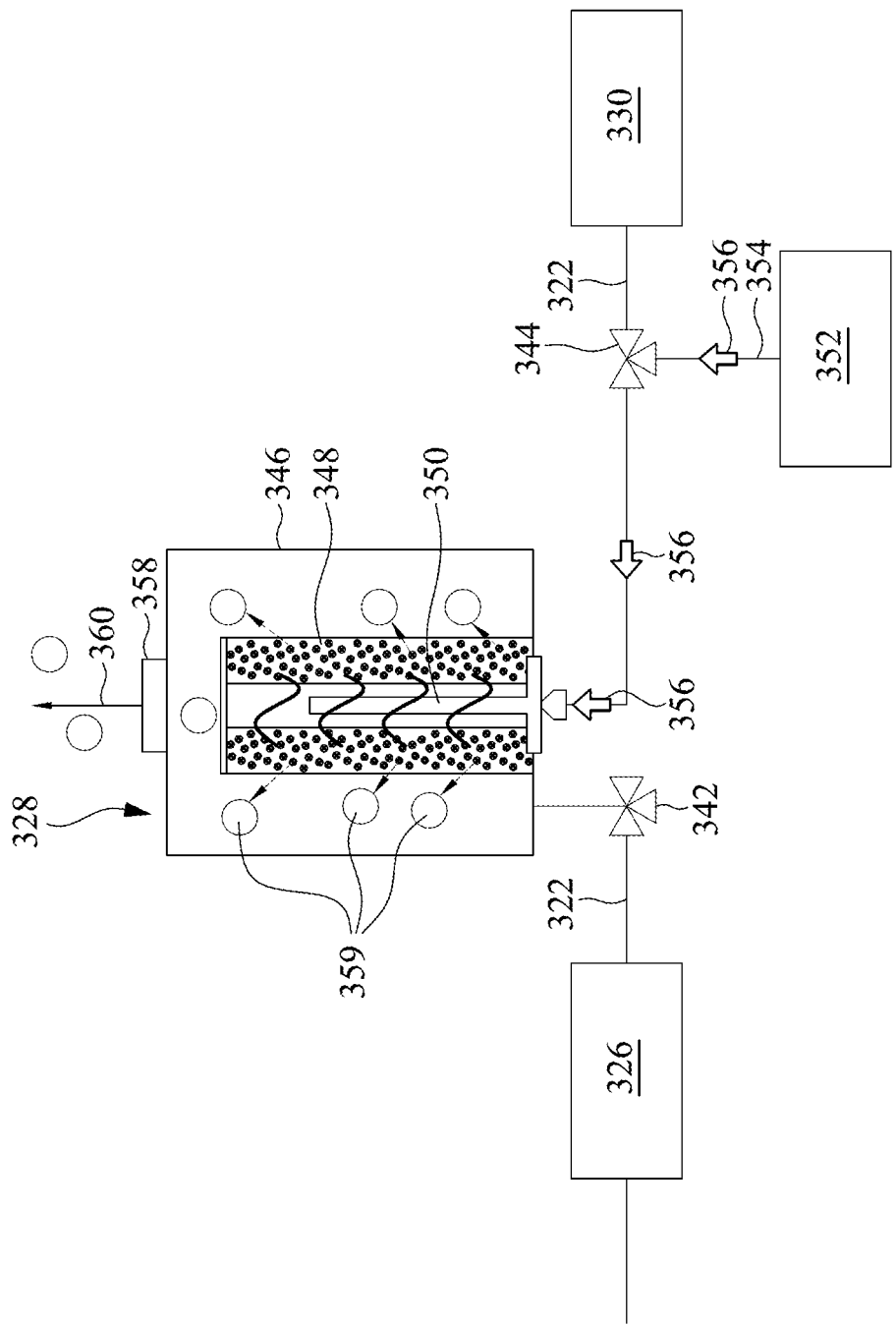
FIG. 4A illustrates a zoomed in view of a filter of the system as shown in FIG. 3A when a backwash regeneration process is performed on the filter, in accordance with some embodiments.

FIG. 4A is directed to a zoomed in view of the third filter 328 of FIG. 3A and provided for purposes of describing performing a backwash regeneration process on the third filter 328 as shown in FIG. 3A. While not shown in FIG. 3A, a first valve 342 is along the fourth fluid pathway 322 and a second valve 344 is along the fourth fluid pathway 322. In the embodiment as shown in FIG. 4A, the first valve 342 is between the first particle counter 326 and the third filter 328 such that the first valve 342 is downstream from the first particle counter 326 and is upstream from the third filter 328. In the embodiment as shown in FIG. 4A, the second valve 344 is between the second particle counter 330 and the third filter 328 such that the second valve 344 is downstream from the third filter 328 and is upstream from the second particle counter 330.

As shown in FIG. 4A, the third filter 328 further includes a housing 346 and a filter membrane 348. The housing 346 may be the same or similar as the housing 204 of the filter cartridge 202 as shown in FIG. 2A, and the filter membrane 348 may be the same or similar to the filter membrane 206 of the filter cartridge 202 as shown in FIG. 2A.

In the embodiment of FIG. 4A, a shaking unit 350 extends into the housing 346 of the third filter 328 and is surrounded by the filter membrane 348. The shaking unit 350 may be integral to the third filter 328 such that the shaking unit 350 is part of the third filter 328 itself. For example, when the third filter 328 is decoupled and removed from the fourth fluid pathway 322, the shaking unit 350 may be part of the third filter 328 such that the shaking unit 350 is removed along with the third filter 328. The third filter 328 may be decoupled and removed from the fourth fluid pathway 322 when replacing the third filter 328 with a new filter after the third filter 328 has deteriorated to an end of its usable lifespan or slightly before the third filter 328 has reached the end of its usable lifespan. In accordance with other embodiments of the present disclosure, the shaking unit 350 is present.

An ultrapure water (UPW) source 352 is in fluid communication with the second valve 344 through a fifth fluid pathway 354 that extends from the UPW source 352 to the second valve 344. The UPW source 352 provides UPW to the third filter 328 when the second valve 344 is opened to allow the UPW to travel along the fifth fluid pathway 354 to the second valve 344, pass through the second valve 344 into the fourth fluid pathway 322, and pass through the fourth fluid pathway 322 into the housing 346 of the third filter 328 to expose the filter membrane 348 to the UPW. Arrows 356 represent a direction of flow of the UPW as shown in FIG. 4A. The second valve 344 also blocks or prevents the UPW from the UPW source to travel along the fourth fluid pathway 322 to the second particle counter 330.

A backwash outlet 358 of the housing 346 is accessible at a top side of the housing 346 of the third filter 328 as shown in FIG. 4A based on the orientation as shown in FIG. 4A. The backwash outlet 358 may be in communication with a respective waste fluid pathway (not shown) that may transport the UPW filled with contaminant particles 359 to a waste water recycling system, device, or apparatus, or may transfer the UPW filled with the contaminant particles 359 to a waste location for disposal. An arrow 360 represents the UPW filled with the contaminant particles 359 exiting the housing 346 of the third filter 328 through the backwash outlet 358. The contaminant particles 359 may be electrically conductive particles such that the first and second particle counters 326, 330, respectively, may detect and count the contaminant particles 359 as well as determine sizes of the contaminant particles 359.

The backwash regeneration process to be discussed in detail as follows herein at least utilizes the first valve 342, the second valve 344, the shaking unit 350, and the UPW source 352 to regenerate and revitalize the filter membrane 348 when the filter membrane 348 is saturated and filled with the contaminant particles 359. In a first step of the backwash regeneration process, the first valve 342 is closed such that the UPW from the UPW source 352 may not readily travel along the fourth fluid pathway 322 to the first particle counter 326, and the second valve 344 is opened such that the UPW from the UPW source 352 may travel along fifth fluid pathway 354, through the second valve 344, and through the fourth fluid pathway 322 as represented by the arrows 356 to introduce the UPW from the UPW source 352 into the housing 346 of the third filter 346. As the UPW flows into the housing 346, the UPW from the UPW source 352 passes through the filter membrane 348 in a direction opposite to the flow of the fluid represented by the arrows 324 as shown in FIG. 3A. The UPW traveling through the filter membrane 348 in this opposite direction backwashes the filter membrane 348 with the UPW and releases at least some of the contaminant particles 359 from the filter membrane 348.

After the UPW from the UPW source 352 passes through the filter membrane 348, the contaminant particles 359 that are released from the filter membrane 348 are within the UPW, and the UPW filled with these contaminant particles 359 exits the housing 346 through the backwash outlet 358, which is opened during the backwash regeneration process to remove the contaminant particles 359 from the filter membrane 348 and from the housing 346 of the third filter 328.

In some embodiments of the backwash regeneration process, the shaking unit 350, which may be an ultrasonic shaking unit, is turned on to shake and vibrate the filter membrane 348 and the housing 346 of the third filter 328 to dislodge contaminant particles 359 trapped or captured by the filter membrane 348 to increase an amount of the contaminant particles 359 that are removed from the filter membrane 348 and exit the housing 346 through the backwash outlet 358.

After the backwash regeneration process has been completed to remove at least some, preferably a majority, of the contaminant particles 359 from the filter membrane 348 and the housing 346 of the third filter 328, the second valve 344 is closed to block the UPW from the UPW source 352 passing through the second valve 344 into the fourth fluid pathway 322, the second valve 344 is opened to allow the fluid, as shown in FIG. 3A, to pass through the second valve 344, and the first valve 342 is opened to allow for the fluid, as discussed with respect to FIG. 3A, to flow through the fourth fluid pathway 322, the first and second particle counters 326, 330, and the third filter 328 as represented by the arrows 324 as shown in FIG. 3A. Before the first valve 342 is opened, the backwash outlet 358 of the housing is closed beforehand such that the fluid as discussed in FIG. 3A may not readily exit the housing 346 through the backwash outlet.

Figure 4B:
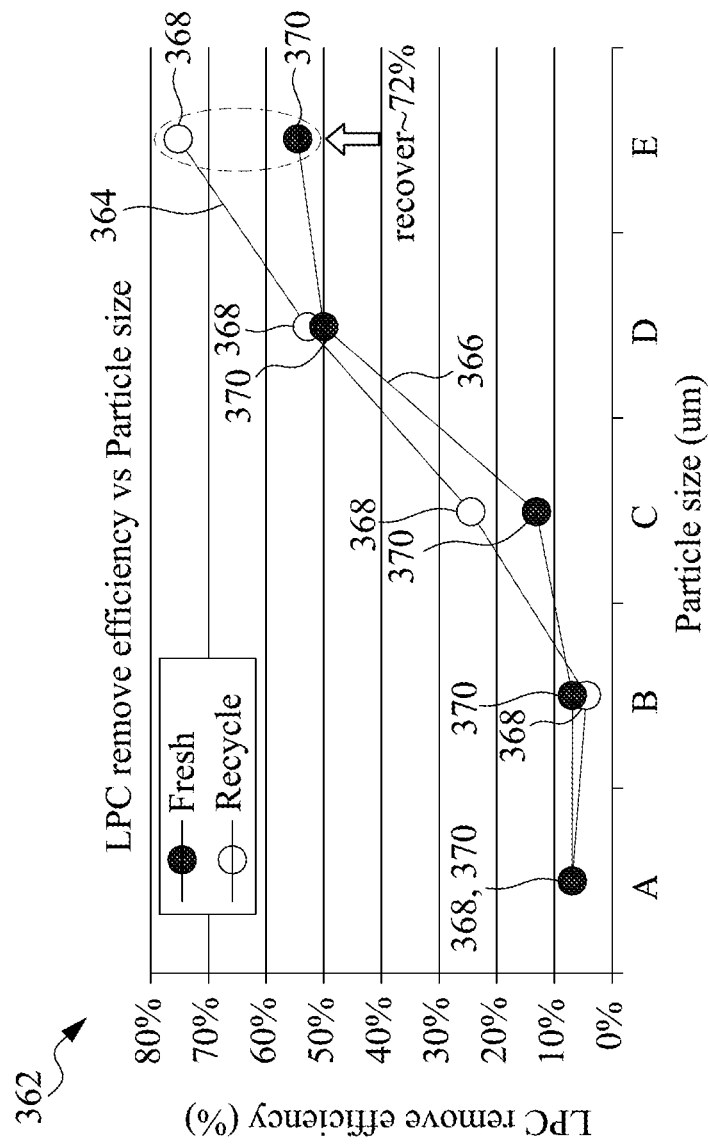
FIG. 4B illustrates a graph directed to results of the backwash regeneration process performed on the filter as shown in FIG. 4A, in accordance with some embodiments.

FIG. 4B is directed to a graph 362 with a first line 364 that represents particle retention efficiencies (%) of the third filter 328 in trapping and capturing different sized ones of the contaminant particles 359 by the filter membrane 348 of the third filter 328 when the third filter 328 is brand new, and a second line 366 that represents particle retention efficiencies (%) of the third filter 328 in trapping and capturing different sized ones of the contaminant particles 359 after the backwash regeneration process as discussed with respect to FIG. 4A has been performed on the third filter 328. As shown in FIG. 4B, the filter membrane 348 has a better contaminant particle retention efficiency (%) when the third filter 328 is new (see the first line 364 plotted in the graph 362) as compared to after the third filter 328 has been utilized for a period of time to filter the contaminant particles 359 from the fluid, and then, performing the backwash regeneration process on the third filter 328 to regenerate and revitalize the third filter 328 (see the second line 366 as plotted in the graph 362).

After the filter membrane 348 of the third filter 328 has been utilized for the period of time, the filter membrane 348 may be trapping and capturing the contaminant particles 359 with less efficiency than the second line 366 as shown in the graph 362. However, after the backwash regeneration process has been performed on the filter membrane 348 of the third filter 328, the contaminant particle retention efficiencies (%) of the filter membrane 348 for the contaminant particles 359 of increasing sizes A, B, C, D and E are mostly or completely regenerated and revitalized. This is represented by first points 368 of the first line 364 being almost equal to corresponding second points 370 of the second line 366 as plotted in the graph 362.

After the backwash regeneration process has been completed on the filter membrane 348, the contaminant particle retention efficiencies (%) for the contaminant particles 359 having sizes C and E are mostly or partially regenerated and revitalized. For example, for the C sized ones of the contaminant particles 359, more than 70% of the contaminant particle retention efficiency (%) is regenerated or revitalized after the backwash regeneration process has been completed as compared to when the filter membrane 348 is brand new. This regeneration of the filter membrane 348 of the third filter 328 allows for the useful lifespan of the filter membrane 348 within the third filter 328 to be increased. Increasing the useful life span of the filter membrane 348 within the third filter 328 reduces costs as the third filter 328 does not have to be replaced as regularly such that new filters are purchased on a less regular basis reducing overall costs to run a semiconductor manufacturing plant (FAB).

While not shown in FIGS. 4A and 4B, the processor 332 as shown in FIG. 3A may be in electrical communication with the first valve 342, the second valve 344, the shaking unit 350, and the UPW source 352. As the filter membrane 348 collects, traps, and filters the contaminant particles 359 from the fluid as discussed above with respect to FIG. 3A, the filter membrane 348 becomes saturated and filled with the contaminant particles 359 such that the filter membrane 348 reduces in efficiency in collecting, trapping, or filtering these contaminant particles such that the particle count of the contaminant particles 359 counted by the second particle counter 330 may increase. This increase of the particle counts at the second particle counter 330 either alone or in combination with other factors that may be monitored by other sensors (e.g., fluid flow sensors, pressure, sensors, etc.) in electrical communication with the processor 332 may be utilized by the processor 332 to determine whether the backwash regeneration process needs to be performed to regenerate and revitalize the filter membrane 348. Performing this backwash regeneration process reduces the likelihood workpieces that are being processed by the workpiece processing tool 311 are exposed to the contaminant particles 359 within the fluid. Once the processor 332 determines that this backwash regeneration process is to be performed, the processor 332 may automatically send control or instruction signals to the first valve 342, the second valve 344, the shaking unit 350, and the UPW source 352 such that the backwash regeneration process as discussed above with respect to FIGS. 4A and 4B is performed on the filter membrane 348. For example, the processor 332 may send a control or instruction signal to the first valve 342 to close the first valve 342, to the second valve 344 to allow the UPW from the UPW source 352 to pass through the second valve 344 while closing off the fourth fluid pathway 322 extending away from the second valve 344 to the second particle counter 330, and to the shaking unit 350 such that the shaking unit 350 begins to shake or vibrate the filter membrane 348 and the housing 346 of the third filter 328.

FIG. 5A is directed to a system 400 including one or more first tanks 402 that store a raw material that is transported through various fluid pathways and through a purifying portion 404 of the system 400 to a second tank 406 of the system 400. The one or more first tanks 402 may be lorry tanks that store the raw material that is received from a truck 408. The raw material may include undesirable materials, e.g., metals that are dissolved or present in the raw material. Such dissolved or present metals can be metal elements, e.g., Na, Mg, K, Ca, Mn, Fe, Co, Ni, Cu, Zn, Cd, Cs, Ba, Pb or Al, or they can be metal containing compounds including such metals, such as Fe or Al salts. The raw material, which may be a fluid, may be circulated through one or more circulation lines 410 to filter the raw material within the one or more first tanks 402 to remove unwanted dissolved or present materials from the raw material. Each of the one or more circulation lines includes one or more first filters 412 that the raw material is circulated through to filter the raw material (e.g., remove unwanted dissolved or present materials and also other unwanted contaminant particles from the raw material). The raw material may be circulated through these one or more circulation lines 410 multiple times to further filter the raw material. The filtered raw material will be referred to as a fluid herein with respect to FIGS. 5A-5D.

After the raw material has been filtered by the one or more circulation lines 410 as shown in FIG. 5A, the fluid is then transported and moved along a first fluid pathway 414 to the purifying portion 404. The fluid is then passed through one or more second filters 416 that further filter and purify the fluid before being transported and moved along the first fluid pathway to the storage tank 406, which may be a day tank that stores the fluid that is to be utilized by workpiece processing tools 417 within a FAB for the day. The second filters 416 may filter out smaller contaminant particles and/or dissolved materials relative to the first filters 412, which may filter out larger contaminant particles and/or dissolved materials. The fluid may be transported to the workpiece processing tool 417 by a third fluid pathway 423 that extends from the second tank 406 to the workpiece processing tool 417.

A reducing agent sampling system 418 is in fluid communication with the purifying portion 404 as shown in FIG. 5A through a second fluid pathway 419. Reducing agent sampling system 418 delivers a reducing agent, e.g., an agent that will react with dissolved materials in the fluid and render them insoluble in the fluid. For example, the reducing agent may reduce metal ions dissolved in the fluid and cause them to precipate out of solution thereby forming larger insoluble particles of a size that can be detected by a sensor, such as particle counter 440 described below. A processor 420 is in electrical communication with the reducing agent sampling system 418, and a display 421 is in electrical communication with the processor 420.

Figure 5B:
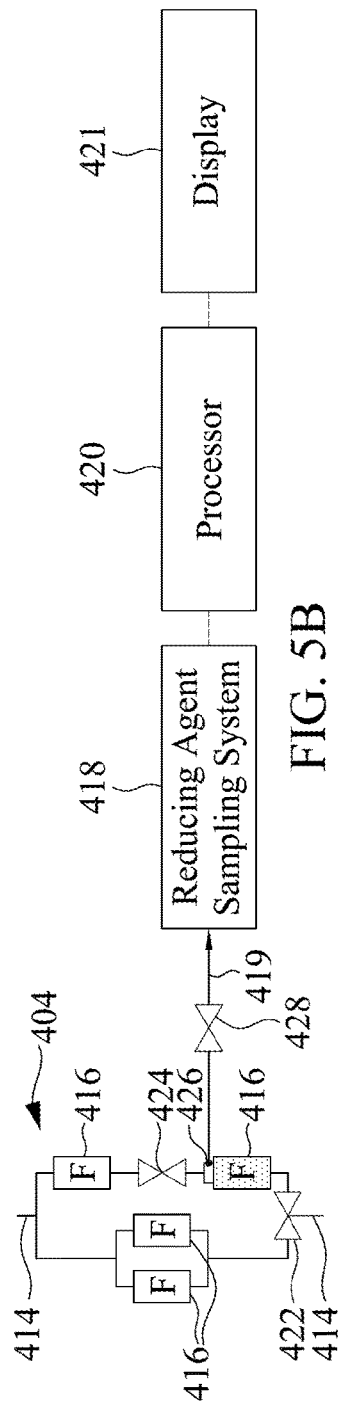
FIG. 5B illustrates a zoomed in view of section 5B-5B as shown in FIG. 5A, in accordance with some embodiments.

FIG. 5B is a zoomed in view of section 5B-5B as shown in FIG. 5A showing additional details not shown in FIG. 5A. A first valve 422 is along the first fluid pathway 414 and is upstream from the one or more second filters 416. A second valve 424 is along the first fluid pathway 414, is downstream from the lower second filter 416 on the right-hand side of the purifying portion 404 based on the orientation as shown in FIG. 5B, and is upstream from the upper second filter 416 on the right-hand side of the purifying portion 404 based on the orientation as shown in FIG. 5B. The second valve 424 is between the lower second filter 416 and the upper second filter 416 on the right-hand side of the purifying portion 404. As shown in FIGS. 5A and 5B, the upper and lower most second filters 416 on the right-hand side of the purifying portion 404 are in series with each other, and the second filters 416 on the left-hand side of the purifying portion 404 are parallel each other.

The second fluid pathway 419 has an end in fluid communication with the first fluid pathway 414 at a sampling point 426 downstream from the lower second filter 416 of the purifying portion 404 and upstream from the upper second filter 416 of the purifying portion 404 at the right-hand side of the purifying portion 404. The sampling point 426 is between the second valve 424 and the lower second filter 416. A third valve 428 is along the second fluid pathway 419 and is between the sampling point 426 and the reducing agent sampling system 418. The third valve 428 may be referred to as a sampling valve.

Figure 5C:
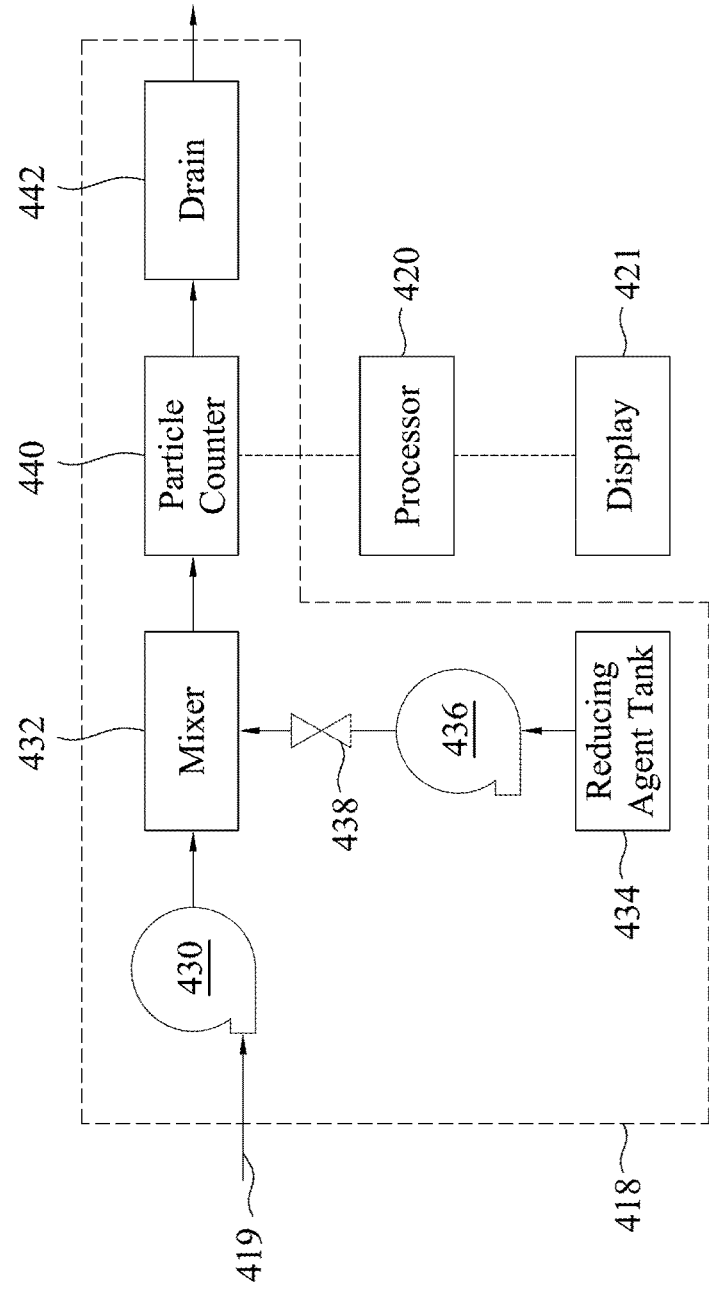
FIG. 5C illustrates a block diagram of a reducing agent sampling system of the system as shown in FIGS. 5A and 5B, in accordance with some embodiments.

FIG. 5C is a detailed block diagram of the reducing agent sampling system 418 in electrical communication with the processor 420. The reducing agent sampling system 418 is enclosed by dotted lines as shown in FIG. 5C.

A first pump 430, which may be optional, of the reducing agent sampling system 418 is in fluid communication with an end of the second fluid pathway 419 opposite the end of the second fluid pathway 419 at the sampling point 426. The first pump 430 may be provided to pump the fluid passing through the first fluid pathway 414 from the sampling point 426 to a mixer 432 of the reducing agent sampling system 418. The mixer 432 may be referred to as an online mixer.

A reducing agent tank 434 of the reducing agent sampling system 418 is in fluid communication with the mixer 432. A second pump 436 is between the reducing agent tank 434 and the mixer 432, and a valve 438 is between the reducing agent tank 434 and the mixer 432. The second pump 436 is between the valve 438 and the reducing agent tank 434 and the valve 438 is between the second pump 436 and the mixer 432. The reducing agent tank 434 contains a reducing agent that is introduced into the mixer 432 by opening the valve 438 and utilizing the second pump 436 to pump the reducing agent from the reducing agent tank 434 to the mixer 432 introducing the reducing agent into the mixer 432 where the reducing agent mixes with fluid from line 419.

A particle counter 440 is downstream from the mixer 432. The particle counter 440 may be similar to or the same as the first and second particle counters 326, 330 as discussed above with respect to FIG. 3A. The particle counter 440 may be referred to as a liquid particle counter (LPC). The particle counter 440 counts insoluble particles (e.g., particles that are insoluble in the fluid) that pass through or by the particle counter 440 and are within a mixed fluid that is output by the mixer 432. In some embodiments, the particle counter is an optical particle counter and can detect larger undissolved particles, e.g., particle having a size greater than 50 nanometers. In other embodiments, the particle counter is an electrical particle counter and can detect smaller particles, e.g., particles having a size less than 50 nanometers. In some embodiments, the distance between the particle counter 440 and the sampling point is such that the time between when a sample is withdrawn at sample point 426 and when that sample reaches the particle counter is less than 1 minute. Maintaining this time interval to less than one minute reduces the likelihood the insoluble particles dissolves and the metal goes back into solution or that the insoluble particles become so large the accuracy of the particle counter is adversely affected. The insoluble particles may be electrically conductive particles such as metal or metal containing particles. In some embodiments, the insoluble particles result, in part, from the interaction between dissolved materials in the fluid and the reducing agent introduced into the fluid by the reducing agent sampling system. The mixed fluid, which is a mixture of the fluid from the sampling point 426 and the reducing agent from the reducing agent tank 434, passes through or by the particle counter 440 such that the particle counter 440 counts the insoluble particles that pass through or by the particle counter 440.

The particle counter 440 is in electrical communication with the processor 420 such that the particle counter 440 outputs electrical signals representative of a count of the insoluble particles counted by the particle counter 440 to the processor 420. These electrical signals output by the particle counter 440 received by the processor 420 are utilized by the processor 420 to determine an amount of dissolved materials, which may be dissolved metals, that are within the fluid that was taken from the sampling point 426. For example, the count of the insoluble particles in the fluid may be representative of the amount of dissolved materials within the fluid. In some embodiments, adjustments will be made to account for the number of metal ions in the insoluble material in order to provide a more accurate prediction of the amount of undissolved materials in the fluid.

The reducing agent sampling system 418 further includes a drain 442 that is downstream the mixer 432 and the particle counter 440. The drain 442 is configured to transport the fluid to exit the reducing agent sampling system 418.

Figure 5D:
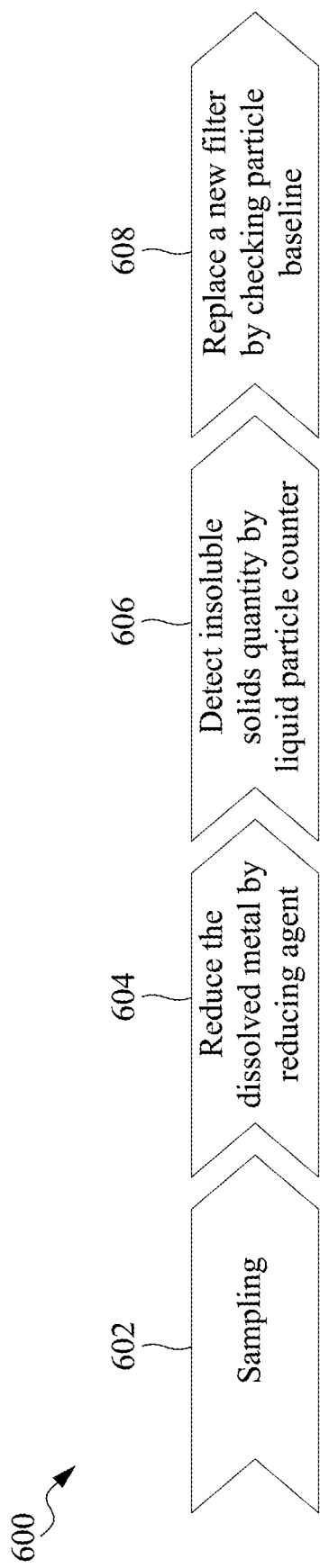
FIG. 5D illustrates a flowchart of a method of utilizing the reducing agent sampling system of the system as shown in FIGS. 5A-5C, in accordance with some embodiments.

FIG. 5D is directed to the flowchart 600 of the method that utilizes the reducing agent sampling system 418 and the processor 420 to determine the amount of dissolved materials (e.g., dissolved metals or dissolved metal containing particles) that are within the fluid at the sampling point 426 after the fluid has passed through the lower second filter 416 at the right-hand side of the purifying portion 404 as shown in FIGS. 5A and 5B. Determining the amount of the dissolved materials in the fluid at the sampling point 426 utilizing the reducing agent sampling system 418 allows for a determination or prediction as to whether the lower second filter 416 of the purifying portion 404 is functioning within tolerances and whether the fluid downstream of the lower second filter 416 is contaminated with too large an amount of dissolved materials (e.g., dissolved metals or dissolved metal containing particles) indicating the second filter 416 is not filtering a sufficient amount of the dissolved materials from the fluid.

In a first step 602, a sample of the fluid is collected from the sampling point 426 by directing the fluid through the first valve 422 to the lower second filter 416 on the right-hand side of the purifying portion 404, passing the fluid through the lower second filter 416, closing the second valve 424, and opening the third valve 428. By opening and closing the first, second, and third valves 422, 424, 428, respectively, in this fashion, the sample of the fluid at the sampling point 426 enters the second fluid pathway 419, passes through the third valve 428, and travels to the reducing agent sampling system 418 for analyzing. The sample of the fluid may be pumped through the second fluid pathway 419 to the mixer 432 by the first pump 430, which may be optional.

After the sample of the fluid reaches the reducing agent sampling system 418, the sample enters the mixer 432. After the sample of the fluid enters the mixer 432, in a second step 604 of the flowchart 600, the valve 438 is opened and the second pump 436 is turned on to pump the reducing agent within the reducing agent tank 434 into the mixer 432 that contains the sample of the fluid. The reducing agent from the reducing agent tank 434 travels through the second pump 436 and the valve 438 such that the reducing agent enters the mixer 432.

Once the sample of the fluid and the reducing agent are present within the mixer 432, the mixer 432 is turned on mixing the sample of the fluid and the reducing agent together. In other embodiments, the mixer may already be running when the fluid and/or the reducing agent are introduced into the mixer. Mixing the sample of the fluid and the reducing agent together reduces dissolved materials (e.g., dissolved metal or dissolved metal containing materials) and converts the dissolved materials into insoluble materials (e.g., insoluble metal or metal containing particles) that are detectable by the particle counter 440. The dissolved materials may be dissolved iron (Fe) iron particles within the sample of the fluid, and the reducing agent may be a nucleophile hydride particle (e.g., a 1A alkali metal hydride such as $NaBH_4$, $LiAlH_4$, or some other similar or like nucleophile hydride that may be utilized to reduce a dissolved metal particle and initiate the conversion of the dissolved metal particle to an insoluble metal particle).

Once the sample of the fluid and the reducing agent are fully mixed into a mixed solution after a selected period of time, in a third step 606 of the flowchart 600 of the method, the mixer 432 is turned off and the mixed solution mixed from the sample of the fluid and the reducing agent is passed through the particle counter 440 of the reducing agent sampling system 418. The mixed solution contains the insoluble particles (e.g., insoluble metal particles) resulting from the reduction of the dissolved materials (e.g., dissolved metal particles) by the reducing agent. As the mixed solution containing the insoluble particles passes through the particle counter 440, the particle counter 440 counts the number of the insoluble particles and determines sizes of the insoluble particles as well.

The particle counter 440 then outputs electrical signals representative of the total number of the insoluble particles that are counted as well as the sizes of the counted insoluble particles to the processor 420. This data for the count of the insoluble particles and the sizes of the insoluble particles may be utilized to plot a graph similar to the second line 338 as shown in FIG. 3B. As described above this line can be compared to a plot of % particle retention and particle size (e.g., line 336 in FIG. 3B determined from the updated technical specification as determined utilizing the flowchart 228 of the method as shown in FIG. 2B). In other words, the processor 420 may complete a comparison between these two plots that is similar to the comparison completed by the processor 332 as discussed with respect to FIG. 3B.

The processor 420 analyzes this information from the particle counter 440 to determine whether a control or instruction signal is to be provided to the display 421 to output a notice on the display 421. This notice may be a warning or notice that the lower second filter 416 on the right-hand side of the purifying portion 404 may need to be replaced or may need to be regenerated by performing a backwash regeneration process. If a backwash regeneration process has already been carried out on the lower second filter 416 one or more times in the past, the processor 420 may output a replacement warning or notice without the backwash regeneration warning or notice. In other words, the processor 420 may analyze other factors or parameters in determining whether the lower second filter 416 must be replaced as the lower second filter 416 is reaching an end of the usable lifespan, or whether a backwash regeneration process may be successful in regenerating the lower second filter 416.

The processor 420 may be in electrical communication with other sensors (e.g., pressure sensors, fluid flow rate sensors, temperature sensors, etc.) of the system 400 that are not shown. The processor 420 may utilize this information collected from the other sensors along with the information collected from the particle counter 440 to make other determinations as well to control and monitor the functionality of the system 400 in real time.

After the sample of the fluid has moved downstream from the particle counter 440, the sample of the fluid exits the reducing agent sampling system 418 through the drain 442. The sample of the fluid that exits the reducing agent sampling system 418 through the drain 442 may be transported along a fluid pathway to a waste location for disposal or a waste water recycling system, device, or apparatus to be cleaned and reutilized.

In a fourth step 608 after the third step 606, if the processor 420 determines that the lower second filter 416 is to be replaced, the lower second filter 416 is decoupled and removed from the first fluid pathway 414 and a new replacement filter is coupled to the first fluid pathway 414 at a location along the first fluid pathway 414 that the lower second filter 416 was previously present. Alternatively, if the processor 420 determines that a backwash regeneration process may be successful in regenerating the lower second filter 416, the backwash regeneration process may be carried out on the lower second filter 416. The backwash regeneration process may be the same or similar to the backwash regeneration process as discussed above with respect to FIGS. 4A and 4B.

In view of the above discussion within the present disclosure, the respective systems and methods described herein may be combined to be utilized together to improve real time and real world monitoring of efficiency of respective filters when in use within various systems of a semiconductor manufacturing plant (FAB). By combining these systems and methods described herein to monitor real time and real world efficiency of these respective filters, a likelihood of exposing a workpiece (e.g., wafer, substrate, silicon substrate, etc.) to contaminant particles is reduced. Reducing this likelihood of exposure to these contaminant particles results in an improved yield of semiconductor devices or packages output by a FAB as there is less chance of the workpieces being exposed to these contaminant particles, which in turn will reduce costs as there are less scrap costs due to fewer defective semiconductor devices or packages that are output or manufactured by the FAB.

In view of the above discussion within the present disclosure, at least some of the methods and systems herein are utilized in monitoring the filters in real time reduces the need to shut down the process for purposes of evaluating the condition of the filters. Reducing the need to shut down the process for purposes of evaluating the condition of the filters improves the overall efficiency of the processes by not reducing the throughput of the process due to shutdown.

In view of the above discussion within the present disclosure, at least some of the methods and systems described herein are utilized to evaluate and possibly update manufacturer technical specifications for filters that are inaccurate. By replacing the manufacturer technical specification with a more accurate updated technical specification, the updated technical specification may be utilized to more accurately monitor efficiency of respective filters, and make more accurate determinations as to whether the respective filters need to be replaced or whether a backwash regeneration process needs to be performed on one or more of the respective filters. This improves the efficiency of the filters, and, therefore, reduces the likelihood of exposing workpieces to contaminant particles, which in turn reduces costs as there are less scrap costs due to defective semiconductor devices or packages being output or manufactured by the FAB.

A system may be summarized as including a storage tank; a fluid stored within the storage tank; a pipe including: an end at the storage tank and in fluid communication with the storage tank; and a fluid pathway extending from the end, the fluid pathway configured to transport the fluid to a location spaced apart from the storage tank; a filter along the fluid pathway of the pipe, the filter configured to filter the fluid as the fluid passes through the filter along the fluid pathway of the pipe; a first particle counter along the fluid pathway and upstream from of the filter, the first particle counter configured to, in operation, count particles within the fluid as the fluid passes along the fluid pathway; and a second particle counter along the fluid pathway and downstream from the filter, the second particle counter configured to, in operation, count the particles within the fluid as the fluid passes along the fluid pathway.

A method may be summarized as including introducing a fluid into an end of a pipe in a first direction; moving the fluid through a fluid pathway of the pipe in the first direction to a first particle counter along the fluid pathway of the pipe; counting contaminant particles in the fluid with the first particle counter as the fluid passes through the first particle counter in the first direction; transmitting a first signal output by the first particle counter to a processor in electrical communication with the first particle counter; moving the fluid through the fluid pathway of the pipe in the first direction away from the first particle counter to a filter downstream from the first fluid particle counter; filtering the fluid with the filter as the fluid passes through the filter in the first direction; moving the fluid through the fluid pathway of the pipe to a second particle counter downstream from the first particle counter and downstream from the filter in the first direction; counting the contaminant particles in the fluid with the second particle counter as the fluid passes through the second particle counter; transmitting a second signal output by the second particle counter to the processor in electrical communication with the second particle counter; and processing the first signal and the second signal with the processor and outputting a notice with respect to the filter.

The notice may be a replace filter notice or a perform backwash regeneration notice.

The method may further include replacing the filter when the notice is the replace filter notice.

The method may further include performing a backwash regeneration of the filter by moving a respective fluid through the fluid pathway in a second direction opposite to the first direction and passing the respective fluid through the filter in the second direction.

The respective fluid may be different from the fluid.

The performing the backwash regeneration of the filter further may include ultrasonic shaking the filter.

Outputting the notice may include outputting the notice to a display in electrical communication with the processor.

A method may be summarized as including manufacturing a semiconductor device including: positioning a substrate including a material layer in a processing chamber of a processing tool; flowing a chemical fluid through a fluid pathway of a pipe having an end in fluid communication with the processing chamber, the flowing the chemical fluid through a fluid pathway of a pipe including flowing the chemical fluid in a first direction away from a first particle counter along the pipe to a filter and flowing the chemical fluid in the first direction to a second particle counter along the pipe downstream from the first particle counter; applying the chemical fluid from the pipe onto the material layer when in the processing chamber; and performing a refinement process on the material layer when present within the processing chamber.

A system may be summarized as including a pipe including a fluid pathway; a filter along the fluid pathway of the pipe, the filter configured to, in operation, filter a fluid moving through the fluid pathway and passing through the filter; a sampling valve in fluid communication with the fluid pathway and located downstream from the filter, the sampling valve including an opened position and a closed position; and a reducing agent sampling system in fluid communication with the sampling valve, the reducing agent sampling system is configured to, in operation, receive the fluid when the sampling valve is in the opened position, convert materials dissolved in the fluid into insoluble particles within the fluid received by the reducing agent sampling system, and count the insoluble particles within the fluid after the dissolved particles are converted into insoluble particles.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from from the spirit and scope of the present disclosure, and that they may make various changes, substitutions, and alterations herein without departing from the spirit and scope of the present disclosure.

What is claimed is:

1. A system, comprising:
    a storage tank;
    a fluid stored within the storage tank;
    a pipe including:
        an end at the storage tank and in fluid communication with the storage tank; and
        a fluid pathway extending from the end, the fluid pathway configured to transport the fluid to a location spaced apart from the storage tank;
    a filter along the fluid pathway of the pipe, the filter configured to filter the fluid as the fluid passes through the filter along the fluid pathway of the pipe;
    a first particle counter along the fluid pathway and upstream from of the filter, the first particle counter configured to, in operation, count particles within the fluid as the fluid passes along the fluid pathway;
    a second particle counter along the fluid pathway and downstream from the filter, the second particle counter configured to, in operation, count the particles within the fluid as the fluid passes along the fluid pathway;
    a backwash valve along the pipe, the backwash valve being between the filter and the second particle counter along the pipe, the backwash valve configured to, in operation, perform a backwashing regeneration operation to backwash the filter; and
    a backwash fluid source in fluid communication with the backwash valve, and
    wherein the backwash valve is positioned between the filter and the second particle counter to prevent, in operation, a backwash fluid from traveling to the second particle counter.

2. The system of claim 1, further comprising a processor in electrical communication with the first particle counter and the second particle counter, the processor configured to, in operation, receive a first signal from the first particle counter and a second signal from the second particle counter.

3. The system of claim 2, wherein:
    the first signal represents a first count of a number of the particles counted by the first particle counter; and
    the second signal represents a second count of a number of the particles counted by the second particle counter.

4. The system of claim 1, wherein the processor is configured to utilize the first signal and the second signal to output a take action notice.

5. The system of claim 4, wherein the take action notice includes at least one of a replacement notice and a backwash regeneration notice.

6. The system of claim 1, further comprising:
    a circulation valve along the fluid pathway of the pipe and upstream from the filter;
    a circulation pipe including:
        a first end at the storage tank and in fluid communication with the storage tank;
        a second end opposite to the first end, the second end at the circulation valve and in fluid communication with the circulation valve; and
        a fluid pathway extending from the first end to the second end; and a circulation filter along the fluid pathway of the circulation pipe.

7. The system of claim 6, wherein the circulation valve is configured to, in operation, close and thereby direct the fluid through the fluid pathway of the circulation pipe and through the circulation filter, and, successively, pass the fluid through the circulation valve and the fluid pathway of the pipe to the end of the pipe in fluid communication with the storage tank.

8. A system, comprising:
a pipe including a fluid pathway;
a filter along the fluid pathway of the pipe, the filter configured to, in operation, filter a fluid moving through the fluid pathway and passing through the filter;
a sampling valve in fluid communication with the fluid pathway and located downstream from the filter, the sampling valve including an opened position and a closed position; and
a reducing agent sampling system in fluid communication with the sampling valve, the reducing agent sampling system is configured to, in operation, receive the fluid when the sampling valve is in the opened position, convert materials dissolved in the fluid into insoluble particles within the fluid received by the reducing agent sampling system, and count the insoluble particles within the fluid after the dissolved particles are converted into insoluble particles.

9. The system of claim 8, wherein the reducing agent sampling system further includes:
a sampling pipe in fluid communication with the sampling valve, the sampling pipe including a sampling fluid pathway in fluid communication with sampling valve;
a reducing agent tank downstream from the sampling valve;
a reducing agent pump in fluid communication with the reducing agent tank and the sampling fluid pathway, the reducing agent pump configured to, in operation, introduce a reducing agent stored in the reducing agent tank into the sampling fluid pathway; and
a particle counter downstream from the reducing agent pump, the particle counter configured to, in operation, count a number of the insoluble particles in the fluid after the reducing agent is introduced into the sampling fluid pathway.

10. The system of claim 9, further comprising a processor in electrical communication with the particle counter, the processor configured to, in operation, receive an electrical signal from the particle counter representative of the insoluble particles counted by the particle counter and utilize the electrical signal to output a notice with respect to the filter.

11. The system of claim 10, wherein the notice is a replace filter notice or a backwash regeneration notice.

12. The system of claim 11, wherein:
the notice is the replace filter notice when the number of particles is greater than a first threshold;
the notice is the backwash regeneration notice when the number of particles is greater than a second threshold; and
the second threshold is different from the first threshold.

13. The system of claim 9, wherein the dissolved material is iron (Fe) and the reducing agent is a nucleophile hydride.

14. A system, comprising:
a storage tank containing a fluid;
a circulation fluid pathway in fluid communication with the storage tank;
a first filter along the circulation fluid pathway;
a valve along the circulation fluid pathway and downstream from the first filter along the circulation fluid pathway;
a workpiece tool fluid pathway in fluid communication with the valve;
a second filter along the workpiece fluid pathway, the second filter configured to filter the fluid as the fluid passes through the second filter along the workpiece tool fluid pathway;
a first particle counter along the workpiece tool fluid pathway and upstream from of the second filter, the first particle counter configured to, in operation, count particles within the fluid as the fluid passes along the workpiece tool fluid pathway;
a second particle counter along the workpiece tool fluid pathway and downstream from the second filter, the second particle counter configured to, in operation, count the particles within the fluid as the fluid passes along the workpiece tool fluid pathway;
a processor in electrical communication with the first particle counter and the second particle counter, the processor configured to, in operation, receive a first signal from the first particle counter and a second signal from the second particle counter; and
a backwash valve along the workpiece tool fluid pathway, the backwash valve being between the filter and the second particle counter along the workpiece tool fluid pathway, the backwash valve configured to, in operation, perform a backwashing regeneration operation to backwash the second filter; and
a backwash fluid source in fluid communication with the backwash valve, and
wherein the backwash valve is positioned between the second filter and the second particle counter to prevent, in operation, a backwash fluid from traveling to the second particle counter.

15. The system of claim 14, wherein the processor is configured to output a notice with respect to the second filter.

16. The system of claim 15, wherein the notice is a replace filter notice or a backwash regeneration notice.

17. The system of claim 16, wherein:
the notice is the replace filter notice when the number of particles is greater than a first threshold;
the notice is the backwash regeneration notice when the number of particles is greater than a second threshold; and
the second threshold is different from the first threshold.

18. The system of claim 14, wherein:
the first signal represents a first count of a number of the particles counted by the first particle counter; and
the second signal represents a second count of a number of the particles counted by the second particle counter.

19. The system of claim 14, further comprising:
a raw material tank containing a raw material fluid;
a raw material fluid pathway in fluid communication with the raw material tank and the storage tank;
one or more pumps along the raw material fluid pathway, the one or more pumps are configured to, in operation, pump the raw material fluid from the raw material tank to the storage tank; and
a third filter along the raw material fluid pathway and downstream the one or more pumps, the raw material fluid passes through the third filter when moving along the raw material fluid pathway filtering the raw material fluid before entering the storage tank.

20. The system of claim 14, further comprising a display in electrical communication with the processor, and the display is configured to, in operation, display a notice output by the processor.

* * * * *